(12) United States Patent
Liu et al.

(10) Patent No.: US 11,696,166 B2
(45) Date of Patent: Jul. 4, 2023

(54) METHOD AND DEVICE IN A NODE USED FOR WIRELESS COMMUNICATION

(71) Applicants: Zheng Liu, Shanghai (CN); Xiaobo Zhang, Shanghai (CN); Lin Yang, Shanghai (CN)

(72) Inventors: Zheng Liu, Shanghai (CN); Xiaobo Zhang, Shanghai (CN); Lin Yang, Shanghai (CN)

(73) Assignee: SHANGHAI LANGBO COMMUNICATION TECHNOLOGY COMPANY LIMITED, Shanghai (CN)

( * ) Notice: Subject to any disclaimer, the term of this patent is extended or adjusted under 35 U.S.C. 154(b) by 0 days.

(21) Appl. No.: 17/837,064

(22) Filed: Jun. 10, 2022

(65) Prior Publication Data

US 2022/0303816 A1    Sep. 22, 2022

Related U.S. Application Data

(63) Continuation of application No. 16/835,341, filed on Mar. 31, 2020, now Pat. No. 11,395,170, which is a
(Continued)

(30) Foreign Application Priority Data

Aug. 13, 2018    (CN) .......................... 201810916445.2

(51) Int. Cl.
*H04W 24/10*    (2009.01)
*H04L 1/00*    (2006.01)
(Continued)

(52) U.S. Cl.
CPC ........... *H04W 24/10* (2013.01); *H04L 1/0003* (2013.01); *H04L 5/0094* (2013.01); *H04W 72/0446* (2013.01); *H04W 72/0453* (2013.01)

(58) Field of Classification Search
CPC ............ H04W 24/10; H04W 72/0446; H04W 72/0453; H04W 24/08; H04W 4/20;
(Continued)

(56) References Cited

U.S. PATENT DOCUMENTS 10,237,874 B2 *  3/2019   Mok ................. H04W 36/0072
11,357,059 B2 *  6/2022   Deenoo ................. H04W 76/27
(Continued)

FOREIGN PATENT DOCUMENTS

CN         107105000 A      8/2017
CN         107371258 A      11/2017
(Continued)

OTHER PUBLICATIONS

First Office Action received in application No. CN201810916445.2 dated Aug. 3, 2021.
(Continued)

*Primary Examiner* — Brian T O Connor

(57) ABSTRACT

The present disclosure discloses a method and a device in a communication used for wireless communication. The communication node first performs X measurement(s) respectively in X time-frequency unit(s), the X measurement(s) respectively being used for acquiring X first-type measurement value(s), the X being a positive integer; and then performs a first measurement, the first measurement being used for acquiring a second-type measurement value; and finally transmits a first radio signal; herein, the X first-type measurement value(s) is(are) used for the first measurement, the second-type measurement value acquired by performing the first measurement is used for determining at least one of an MCS employed by the first radio signal or time-frequency resources occupied by the first radio signal; a number of time-frequency resources occupied by one of the X time-
(Continued)

frequency unit(s) is related to a subcarrier spacing of subcarriers occupied by the first radio signal.

20 Claims, 16 Drawing Sheets

Related U.S. Application Data continuation of application No. PCT/CN2019/098839, filed on Aug. 1, 2019.

(51) Int. Cl.
*H04L 5/00* (2006.01)
*H04W 72/0446* (2023.01)
*H04W 72/0453* (2023.01)

(58) Field of Classification Search
CPC ...... H04W 4/40; H04L 1/0003; H04L 5/0094; H04L 27/26025; H04L 27/261; H04L 1/00
See application file for complete search history.

(56) References Cited

U.S. PATENT DOCUMENTS

| | | | |
|---|---|---|---|
| 11,395,170 B2 * | 7/2022 | Liu | H04W 72/0453 |
| 2016/0029562 A1 | 10/2016 | De Smet | |
| 2020/0187252 A1 * | 6/2020 | Lee | H04W 72/0446 |
| 2021/0185721 A1 * | 6/2021 | Cheng | H04L 1/1671 |
| 2021/0289496 A1 * | 9/2021 | Lee | H04W 74/0808 |
| 2021/0314917 A1 * | 10/2021 | Lee | H04W 72/02 |
| 2021/0321370 A1 * | 10/2021 | Lee | H04W 4/40 |
| 2021/0329634 A1 * | 10/2021 | Kim | H04L 27/26 |
| 2021/0368541 A1 * | 11/2021 | Hedayat | H04W 74/0816 |
| 2021/0377956 A1 * | 12/2021 | Lee | H04W 72/541 |

FOREIGN PATENT DOCUMENTS

| | | |
|---|---|---|
| CN | 107645735 A | 1/2018 |
| CN | 107889158 A | 4/2018 |
| CN | 2018084599 A1 | 5/2018 |
| CN | 108307409 A | 7/2018 |

OTHER PUBLICATIONS

First Search Report received in application No. CN201810916445.2 dated Jul. 22, 2021.
Samsung."Dicussion on SSB SCS and minimum channel bandwidth" 3GPPTSG-RANWG4Meeting RAN4#84bis R4-1711033,Oct. 13, 2017 (Oct. 13, 2017).section 2.
International Search Report of the application No. PCT/CN2019/098839 dated Sep. 26, 2019.

* cited by examiner

| Indexes (P=4) | P candidate intervals | P candidate MCS sets | P candidate resource quantities |
|---|---|---|---|
| 1 | [0, 0.25) | {0, 1, 2 ..., 9} | {$a_1, a_2, a_3, a_4$} |
| 2 | [0.25, 0.5) | {7, 8, 9 ..., 16} | {$b_1, b_2, b_3, b_4$} |
| 3 | [0.5, 0.75) | {14, 15, 18 ..., 23} | {$c_1, c_2, c_3, c_4$} |
| 4 | [0.75, 1] | {21, 25, 26 ..., 31} | {$d_1, d_2, d_3, d_4$} |

FIG. 11

| Frequency Range (FR) | Subcarrier Spacing | Q groups of first-type measurement values (Q=5) |
|---|---|---|
| FR1 (<6GHz) | 15KHz | $\{a_{11}, a_{12}, a_{13}, ..., a_{1\alpha}\}$ |
| | 30KHz | $\{\mathbf{a_{21}, a_{22}, a_{23}, ..., a_{2\beta}}\}$ |
| | 60KHz | $\{a_{31}, a_{32}, a_{33}, ..., a_{3\mu}\}$ |
| FR2 (>6GHz) | 120KHz | $\{a_{41}, a_{42}, a_{43}, ..., a_{4\delta}\}$ |
| | 240KHz | $\{a_{51}, a_{52}, a_{53}, ..., a_{5\sigma}\}$ |

FIG. 14

METHOD AND DEVICE IN A NODE USED FOR WIRELESS COMMUNICATION

CROSS-REFERENCE TO RELATED APPLICATION

This application is a continuation of the U.S. patent application Ser. No. 16/835,341, filed on Mar. 31, 2020, which is a continuation of International Application No. PCT/CN2019/098839, filed on Aug. 1, 2019, claiming the priority benefit of Chinese Application No. 201810916445.2, filed on Aug. 13, 2018, the full disclosure of which is incorporated herein by reference.

BACKGROUND

Technical Field

The present disclosure relates to transmission methods and devices in wireless communication systems, and in particular to a scheme and a device for measurement in wireless communication.

Related Art

Application scenarios of future wireless communication systems are becoming increasingly diversified, and different application scenarios have different performance demands on systems. In order to meet different performance requirements of various application scenarios, the $3^{rd}$ Generation Partner Project (3GPP) Radio Access Network (RAN) #72 plenary session decided to conduct the study of New Radio (NR), or what is called fifth Generation (5G). The work Item (WI) of NR was approved at the 3GPP RAN #75 session to standardize the NR.

In response to rapidly growing Vehicle-to-Everything (V2X) business, 3GPP has started standards setting and research work under the framework of NR. Currently, 3GPP has completed planning work targeting 5G V2X requirements and has included these requirements into standard TS22.886, where 3GPP identifies and defines 4 major Use Case Groups, covering cases of Vehicles Platooning, supporting Extended Sensors, Advanced Driving and Remote Driving. At 3GPP RAN #80 Plenary Session, the technical Study Item (SI) of NR V2X was approved.

SUMMARY

Compared with the existing LTE systems, 5G NR has an outstanding feature of supporting more flexible Numerologies, which includes Subcarrier Spacing (SCS) and Cyclic Prefix (CP), and more flexible frame structures, such as of mini-slot, sub-slot and slot aggregation. With such flexible numerologies and frame structures, various new business requirements will be better satisfied, especially in highly diversified vertical industries. A stricter payload balance control is a significant characteristic that differentiates V2X from traditional cellular network, since effective payload control can reduce the probability of business conflicts and improve transmission reliability, which are critical factors for successful V2X. In LTE V2X system, however, a measurement mechanism for payload control is designed based on a single Numerology, namely, 15 kHz SCS, normal length of CP and 1 ms of subframe length, making it impossible to meet the requirement of more flexible Numerology of 5G NR V2X.

In view of the above problem of measurement in NR V2X, the present disclosure provides a solution. It should be noted that if there is no conflict, the embodiments in a User Equipment (UE) of the present disclosure and the characteristics in the embodiments may be applied to a base station of the present disclosure, and vice versa. The embodiments and the characteristics in the embodiments can be mutually combined if no conflict is incurred.

The present disclosure provides a method in a first-type communication node for wireless communication, comprising:

performing X measurement(s) respectively in X time-frequency unit(s), the X measurement(s) respectively being used for acquiring X first-type measurement value(s), the X being a positive integer;

performing a first measurement, the first measurement being used for acquiring a second-type measurement value; and transmitting a first radio signal;

herein, the X first-type measurement value(s) is(are) used for the first measurement, a second-type measurement value acquired by performing the first measurement is used for determining at least one of a Modulation Coding Scheme (MC S) employed by the first radio signal or time-frequency resources occupied by the first radio signal; a number of time-frequency resources occupied by a time-frequency unit of the X time-frequency unit(s) is related to a subcarrier spacing of subcarriers occupied by the first radio signal.

In one embodiment, the method in the present disclosure associates the size(s) of time-frequency resource(s) occupied by time-frequency unit(s) of the X time-frequency unit(s) with an SCS of subcarriers occupied by the first radio signal, therefore, the granularity of a measurement(s) on first-type measurement value(s) may vary according to an SCS employed in transmission, and the accuracy of measurement(s) will be increased, thus enabling the outcome of the measurement(s) to better reflect requests of actual transmission and scheduling.

According to one aspect of the present disclosure, the above method is characterized in further comprising:

receiving first information;

herein, each of X1 first-type measurement value(s) out of the X first-type measurement value(s) is greater than a target threshold, the second-type measurement value acquired by performing the first measurement is equal to a ratio of the X1 to the X, the X1 is a non-negative integer not greater than the X, the first information is used for determining the target threshold.

According to one aspect of the present disclosure, the above method is characterized in that a characteristic measurement value is a first-type measurement value of the X first-type measurement value(s), a measurement of the X measurement(s) used for acquiring the characteristic measurement value is performed in a characteristic time-frequency unit, the characteristic time-frequency unit is a time-frequency unit of the X time-frequency unit(s), the characteristic time-frequency unit comprises X2 multicarrier symbol(s) in time domain, the characteristic measurement value is an average value of receiving power value(s) of the X2 multicarrier symbol(s) within frequency domain resources occupied by the characteristic time-frequency unit.

According to one aspect of the present disclosure, the above method is characterized in further comprising:

transmitting a first signaling;

herein, the first signaling is used for indicating at least one of the MCS employed by the first radio signal, the time-frequency resources occupied by the first radio signal, or the subcarrier spacing of subcarriers occupied by the first radio signal, the first signaling is transmitted via an air interface; the X time-frequency unit(s) belongs(belong) to a first time window in time domain, the first measurement is performed in a second time window, an end time for the first time window is no later than a start time for the second time window, and an end time for the second time window is no later than a start time for transmission of the first radio signal.

According to one aspect of the present disclosure, the above method is characterized in further comprising:

receiving second information;

herein, the second-type measurement value acquired by performing the first measurement belongs to a target interval, the target interval is one of P candidate intervals, any candidate interval of the P candidate intervals is an interval of positive rational numbers, the P candidate intervals respectively correspond to P candidate MCS sets, the P candidate intervals respectively correspond to P candidate resource quantity sets, the P is a positive integer greater than 1; a candidate MCS set of the P MCS sets that corresponds to the target interval is a first MCS set, and a candidate resource numerical value set of the P candidate resource numerical value sets that corresponds to the target interval is a first resource numerical value set; the second information is used for determining at least one of the MCS employed by the first radio signal and the time-frequency resources occupied by the first radio signal, the MCS employed by the first radio signal is an MCS in the first MCS set, a number of the time-frequency resources occupied by the first radio signal is equal to a resource quantity in the first resource quantity set.

According to one aspect of the present disclosure, the above method is characterized in further comprising:

receiving third information;

herein, the third information is used for determining the subcarrier spacing of subcarriers occupied by the first radio signal.

According to one aspect of the present disclosure, the above method is characterized in further comprising:

performing Y measurement(s) in a third time window, the Y measurement(s) is(are) used for respectively acquiring Y third-type measurement value(s), the Y is a positive integer;

herein, the second-type measurement value acquired by performing the first measurement is used for determining a first upper bound, a sum of the Y third-type measurement value(s) is no greater than the first upper bound, a time domain position of the third time window is related to the time-frequency resources occupied by the first radio signal, the Y third-type measurement value(s) is(are) related to a number of time-frequency resources occupied by radio signal(s) transmitted by a transmitter of the first radio signal in the third time window.

According to one aspect of the present disclosure, the above method is characterized in further comprising:

determining a target time-frequency unit set out of Q candidate time-frequency unit sets;

herein, a subcarrier spacing of subcarriers occupied by the first radio signal is a target subcarrier spacing, the target subcarrier spacing is a candidate subcarrier spacing of Q candidate subcarrier spacings, the Q is a positive integer greater than 1; the X time-frequency unit(s) belongs(belong) to the target time-frequency unit set, the Q candidate subcarrier spacings respectively correspond to the Q candidate time-frequency unit sets.

According to one aspect of the present disclosure, the above method is characterized in that the X measurement(s) belongs(belong) to one of Q groups of measurements, the Q groups of measurements respectively correspond to the Q candidate time-frequency unit sets, the Q groups of measurements are used for acquiring Q groups of first-type measurement values, the X first-type measurement value(s) belongs(belong) to one of the Q groups of first-type measurement values, the target subcarrier spacing is used for determining a group of first-type measurement values to which the X first-type measurement value(s) belongs(belong) out of the Q groups of first-type measurement values.

In one embodiment, the first-type communication node performs the Q groups of measurements to the benefit of loosening time limit for scheduling of the first radio signal, as a result, emergent businesses employing varied Numerologies will be able to perform payload control.

The present disclosure provides a method in a second-type communication node for wireless communication, comprising:

transmitting first information;

herein, X measurement(s) respectively performed in X time-frequency unit(s) is(are) respectively used for acquiring X first-type measurement value(s), the X is a positive integer; the X first-type measurement value(s) is(are) used for a first measurement, the first measurement is used for acquiring a second-type measurement value, the second-type measurement value acquired by performing the first measurement is used for determining at least one of an MCS employed by the first radio signal or time-frequency resources occupied by the first radio signal; a number of time-frequency resources occupied by a time-frequency unit of the X time-frequency unit(s) is related to a subcarrier spacing of subcarriers occupied by the first radio signal; each of X1 first-type measurement value(s) out of the X first-type measurement value(s) is greater than a target threshold, the second-type measurement value acquired by performing the first measurement is equal to a ratio of the X1 to the X, the X1 is a non-negative integer not greater than the X, the first information is used for determining the target threshold.

According to one aspect of the present disclosure, the above method is characterized in that a characteristic measurement value is a first-type measurement value of the X first-type measurement value(s), a measurement of the X measurement(s) used for acquiring the characteristic measurement value is performed in a characteristic time-frequency unit, the characteristic time-frequency unit is a time-frequency unit of the X time-frequency unit(s), the characteristic time-frequency unit comprises X2 multicarrier symbol(s) in time domain, the characteristic measurement value is an average value of receiving power value(s) of the X2 multicarrier symbol(s) within frequency domain resources occupied by the characteristic time-frequency unit.

According to one aspect of the present disclosure, the above method is characterized in that the X time-frequency unit(s) belongs(belong) to a first time window in time domain, the first measurement is performed in a second time window, an end time for the first time window is no later than a start time for the second time window, and an end time for the second time window is no later than a start time for transmission of the first radio signal.

According to one aspect of the present disclosure, the above method is characterized in further comprising:
transmitting second information;
herein, the second-type measurement value acquired by performing the first measurement belongs to a target interval, the target interval is one of P candidate intervals, any candidate interval of the P candidate intervals is an interval of positive rational numbers, the P candidate intervals respectively correspond to P candidate MCS sets, the P candidate intervals respectively correspond to P candidate resource quantity sets, the P is a positive integer greater than 1; a candidate MCS set of the P candidate MCS sets that corresponds to the target interval is a first MCS set, and a candidate resource quantity set of the P candidate resource quantity sets that corresponds to the target interval is a first resource quantity set; the second information is used for determining at least one of the MCS employed by the first radio signal and the time-frequency resources occupied by the first radio signal, the MCS employed by the first radio signal is an MCS in the first MCS set, a number of the time-frequency resources occupied by the first radio signal is equal to a resource quantity in the first resource quantity set.

According to one aspect of the present disclosure, the above method is characterized in further comprising:
transmitting third information;
herein, the third information is used for determining the subcarrier spacing of subcarriers occupied by the first radio signal.

The present disclosure provides a first-type communication node for wireless communication, comprising:
a first measurer, performing X measurement(s) respectively in X time-frequency unit(s), the X measurement(s) respectively being used for acquiring X first-type measurement value(s), the X being a positive integer;
a second measurer, performing a first measurement, the first measurement being used for acquiring a second-type measurement value; and
a first transceiver, transmitting a first radio signal;
herein, the X first-type measurement value(s) is(are) used for the first measurement, a second-type measurement value acquired by performing the first measurement is used for determining at least one of an MCS employed by the first radio signal or time-frequency resources occupied by the first radio signal; a number of time-frequency resources occupied by a time-frequency unit of the X time-frequency unit(s) is related to a subcarrier spacing of subcarriers occupied by the first radio signal.

The present disclosure provides a second-type communication node for wireless communication, comprising:
a first transmitter, transmitting first information;
herein, X measurement(s) respectively performed in X time-frequency unit(s) is(are) respectively used for acquiring X first-type measurement value(s), the X is a positive integer; the X first-type measurement value(s) is(are) used for a first measurement, the first measurement is used for acquiring a second-type measurement value, the second-type measurement value acquired by performing the first measurement is used for determining at least one of an MCS employed by the first radio signal or time-frequency resources occupied by the first radio signal; a number of time-frequency resources occupied by a time-frequency unit of the X time-frequency unit(s) is related to a subcarrier spacing of subcarriers occupied by the first radio signal; each of X1 first-type measurement value(s) out of the X first-type measurement value(s) is greater than a target threshold, the second-type measurement value acquired by performing the first measurement is equal to a ratio of the X1 to the X, the X1 is a non-negative integer not greater than the X, the first information is used for determining the target threshold.

In one embodiment, the present disclosure has the following advantages over the prior art in LTE V2X:

Methods in the present disclosure enable the granularity of a measurement(s) on payload status to vary according to the SCS employed in transmission, and the accuracy of measurement(s) will be increased, and the outcome of the measurement(s) will better reflect requests of actual transmission and scheduling.

Methods in the present disclosure help loosen the time limit for the scheduling of transmission, so that emergent businesses employing different Numerologies can perform payload control as well.

Methods in the present disclosure will effectively support payload control in transmissions employing a number of Numerologies so as to support a more diverse business transmission.

BRIEF DESCRIPTION OF THE DRAWINGS

Other features, objects and advantages of the present disclosure will become more apparent from the detailed description of non-restrictive embodiments taken in conjunction with the following drawings:

FIG. 11 illustrates a schematic diagram of relations between P candidate intervals, P candidate MCS sets and P candidate resource quantity sets according to one embodiment of the present disclosure;

FIG. 14 illustrates a schematic diagram of a relation between a target SCS and a group of first-type measurement values to which X first-type measurement value(s) belongs (belong) according to one embodiment of the present disclosure;

DESCRIPTION OF THE EMBODIMENTS

The technical scheme of the present disclosure is described below in further details in conjunction with the drawings. It should be noted that the embodiments of the present disclosure and the characteristics of the embodiments may be arbitrarily combined if no conflict is caused.

Embodiment 1

Figure 1:
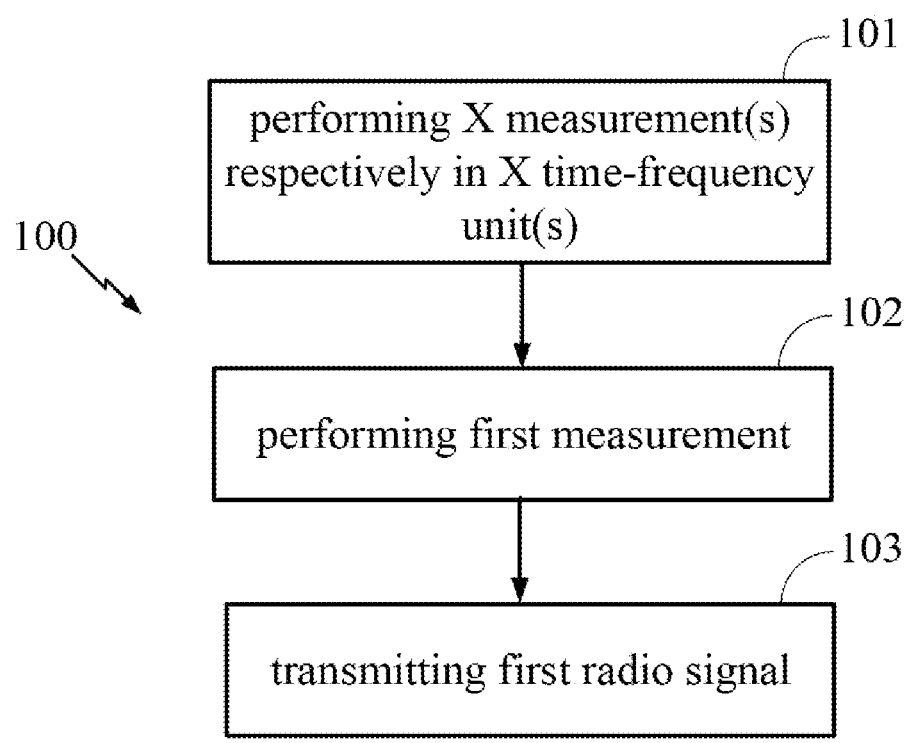
FIG. 1 illustrates a flowchart of X measurement(s), a first measurement and transmitting a first radio signal according to one embodiment of the present disclosure.

Embodiment 1 illustrates a flowchart of X measurement(s), a first measurement and transmitting a first radio signal according to one embodiment of the present disclosure, as shown in FIG. 1. In FIG. 1, each box represents a step. In Embodiment 1, a first-type communication node of the present disclosure performs X measurement(s) respectively in X time-frequency unit(s) in step S101, the X measurement(s) being respectively used for acquiring X first-type measurement value(s), and the X being a positive integer; performs a first measurement in step S102, the first measurement being used for acquiring a second-type measurement value; and transmits a first radio signal in step S103; herein, the X first-type measurement value(s) is(are) used for the first measurement, a second-type measurement value acquired by performing the first measurement is used for determining at least one of an MCS employed by the first radio signal or time-frequency resources occupied by the first radio signal; a number of time-frequency resources occupied by a time-frequency unit of the X time-frequency unit(s) is related to a subcarrier spacing of subcarriers occupied by the first radio signal.

In one embodiment, any measurement of the X measurement(s) is a measurement on power values.

In one embodiment, any measurement of the X measurement(s) is a measurement on an average power in a given time-frequency resource.

In one embodiment, any measurement of the X measurement(s) is a measurement on energies.

In one embodiment, any measurement of the X measurement(s) is a measurement on a Received Signal Strength Indicator (RSSI).

In one embodiment, any measurement of the X measurement(s) is a measurement on a Sidelink Received Signal Strength Indicator (S-RSSI).

In one embodiment, any measurement of the X measurement(s) is a measurement on power values, including power values of signals in a channel(s) measured, signals leaked from neighboring channel(s) to the channel(s) measured, interference in the channel(s) measured and thermal noise.

In one embodiment, any measurement of the X measurement(s) is a measurement on energies, including energies of signals in a channel(s) measured, signals leaked from neighboring channel(s) to the channel(s) measured, interference in the channel(s) measured and thermal noise.

In one embodiment, any measurement of the X measurement(s) is a measurement on power values, including the power value of CP.

In one embodiment, any measurement of the X measurement(s) is a measurement on energies, including the energy of CP.

In one embodiment, any measurement of the X measurement(s) comprises frequency domain filtering.

In one embodiment, any measurement of the X measurement(s) comprises frequency domain filtering within the range of frequency domain of one of the X time-frequency unit(s) where the measurement is performed.

In one embodiment, any measurement of the X measurement(s) comprises filtering from a higher layer filter.

In one embodiment, any measurement of the X measurement(s) comprises filtering from a higher layer a Filter.

In one embodiment, all time-frequency resources occupied by the X time-frequency unit(s) are used for at least one of the X measurement(s).

In one embodiment, there is a time-frequency resource comprised in time-frequency resources occupied by the X time-frequency unit(s) not being used for any of the X measurement(s).

In one embodiment, there is a time-frequency resource comprised in time-frequency resources occupied by the X time-frequency unit(s) being used for any measurement other than the X measurement(s).

In one embodiment, any of the X first-type measurement value(s) is an RSSI value.

In one embodiment, any of the X first-type measurement value(s) is an S-RSSI value.

In one embodiment, any of the X first-type measurement value(s) is a power value.

In one embodiment, any of the X first-type measurement value(s) is an energy value.

In one embodiment, any of the X first-type measurement value(s) is in W.

In one embodiment, any of the X first-type measurement value(s) is in mW.

In one embodiment, any of the X first-type measurement value(s) is in dBm.

In one embodiment, any of the X first-type measurement value(s) is in Joule.

In one embodiment, for a given SCS and CP length, any of the X first-type measurement value(s) is an average of receiving power values of all multicarrier symbols (i.e., Orthogonal Frequency Division Multiplexing (OFDM) symbols, or Single Carrier Frequency Division Multiplexing Access (SC-FDMA) symbols, or Discrete Fourier Transform Spread Orthogonal Frequency Division Multiplexing (DFT-s-OFDM) symbols) comprised within the frequency range of a time-frequency unit where the corresponding measurement is performed.

In one embodiment, for a given SCS and CP length, any of the X first-type measurement value(s) is an average of receiving energies of all multicarrier symbols (i.e., OFDM symbols, or SC-FDMA symbols, or DFT-s-OFDM symbols) comprised within the frequency range of a time-frequency unit where the corresponding measurement is performed.

In one embodiment, for a given SCS and CP length, any of the X first-type measurement value(s) is an average of receiving power values of partial multicarrier symbols (i.e., OFDM symbols, or SC-FDMA symbols, or DFT-s-OFDM symbols) comprised within the frequency range of a time-frequency unit where the corresponding measurement is performed.

In one embodiment, for a given SCS and CP length, any of the X first-type measurement value(s) is an average of receiving energies of partial multicarrier symbols (i.e., OFDM symbols, or SC-FDMA symbols, or DFT-s-OFDM symbols) comprised within the frequency range of a time-frequency unit where the corresponding measurement is performed.

In one embodiment, any two of the X time-frequency units comprise equal numbers of time-frequency resources, the X is greater than 1.

In one embodiment, there are two of the X time-frequency units that comprise unequal numbers of time-frequency resources, the X is greater than 1.

In one embodiment, for a given SCS and CP length, any of the X first-type measurement value(s) occupies a sub-channel in frequency domain and occupies a slot in time domain.

In one embodiment, for a given SCS and CP length, any of the X first-type measurement value(s) occupies a positive integer number of consecutive Physical Resource Blocks (PRBs) and occupies a slot in time domain.

In one embodiment, for a given SCS and CP length, any of the X first-type measurement value(s) occupies a sub-channel in frequency domain and occupies a subframe in time domain.

In one embodiment, for a given SCS and CP length, any of the X first-type measurement value(s) occupies a positive integer number of consecutive PRBs and occupies a sub-frame in time domain.

In one embodiment, for a given SCS and CP length, any of the X first-type measurement value(s) occupies a sub-channel in frequency domain and occupies a positive integer number of consecutive multicarrier symbols in time domain.

In one embodiment, for a given SCS and CP length, any of the X first-type measurement value(s) occupies a positive integer number of consecutive PRBs in frequency domain and occupies a positive integer number of consecutive multicarrier symbols in time domain.

In one embodiment, a number of time-frequency resources occupied by one of the X time-frequency unit(s) is an absolute number of frequency domain resources comprised in the time-frequency unit.

In one embodiment, a number of time-frequency resources occupied by one of the X time-frequency unit(s) is a length of frequency interval of frequency domain resources comprised in the time-frequency unit.

In one embodiment, for a given SCS and CP length, a number of time-frequency resources occupied by one of the X time-frequency unit(s) refers to a number of PRBs comprised by the time-frequency unit in frequency domain.

In one embodiment, for a given SCS and CP length, a number of time-frequency resources occupied by one of the X time-frequency unit(s) refers to a number of sub-channels comprised by the time-frequency unit in frequency domain.

In one embodiment, a number of time-frequency resources occupied by one of the X time-frequency unit(s) refers to a number of subcarriers corresponding to subcarriers of 15 kHz SCS within frequency domain resources comprised by the time-frequency unit in frequency domain.

In one embodiment, a number of time-frequency resources occupied by one of the X time-frequency unit(s) refers to a number of subcarriers corresponding to subcarriers of 60 kHz SCS within frequency domain resources comprised by the time-frequency unit in frequency domain.

In one embodiment, a number of time-frequency resources occupied by one of the X time-frequency unit(s) refers to an absolute number of time domain resources comprised in the time-frequency unit.

In one embodiment, a number of time-frequency resources occupied by one of the X time-frequency unit(s) refers to a length of time interval of time domain resources comprised in the time-frequency unit.

In one embodiment, for a given SCS and CP length, a number of time-frequency resources occupied by one of the X time-frequency unit(s) refers to a number of slots comprised by the time-frequency unit in time domain.

In one embodiment, for a given SCS and CP length, a number of time-frequency resources occupied by one of the X time-frequency unit(s) refers to a number of multicarrier symbols comprised by the time-frequency unit in time domain.

In one embodiment, a number of time-frequency resources occupied by one of the X time-frequency unit(s) refers to a number of multicarrier symbols corresponding to subcarriers of 60 kHz SCS within time domain resources occupied by the time-frequency unit in time domain.

In one embodiment, a number of time-frequency resources occupied by one of the X time-frequency unit(s) refers to a number of multicarrier symbols corresponding to subcarriers of 240 kHz SCS within time domain resources occupied by the time-frequency unit in time domain.

In one embodiment, for a given SCS and CP length, a number of time-frequency resources occupied by one of the X time-frequency unit(s) refers to a number of Resource Elements (REs) comprised in the time-frequency unit, wherein an RE occupies a multicarrier symbol in time domain, and a carrier in frequency domain.

In one embodiment, a number of time-frequency resources occupied by one of the X time-frequency unit(s) refers to a number of basic time-frequency resource elements comprised in the time-frequency unit, wherein a basic time-frequency resource element occupies a fixed length of consecutive time domain resources in time domain and a fixed length of consecutive frequency domain resources in frequency domain.

In one embodiment, when a frequency domain resource occupied by the first radio signal belongs to Frequency Range 1 (FR1), a number of time-frequency resources occupied by one of the X time-frequency unit(s) refers to a number of basic time-frequency resource elements comprised in the time-frequency unit, wherein a basic time-frequency resource element occupies a positive integer number of consecutive multicarrier symbols corresponding to subcarriers of 60 kHz SCS in time domain and occupies a positive integer number of consecutive subcarriers of 15 KHz SCS in frequency domain.

In one embodiment, when a frequency domain resource occupied by the first radio signal belongs to Frequency Range 2 (FR2), a number of time-frequency resources occupied by one of the X time-frequency unit(s) refers to a number of basic time-frequency resource elements comprised in the time-frequency unit, wherein a basic time-frequency resource element occupies a positive integer number of consecutive multicarrier symbols corresponding to subcarriers of 240 kHz SCS in time domain and occupies a positive integer number of consecutive subcarriers of 60 KHz SCS in frequency domain.

In one embodiment, when a frequency domain resource occupied by the first radio signal belongs to FR2, a number of time-frequency resources occupied by one of the X time-frequency unit(s) refers to a number of basic time-frequency resource elements comprised in the time-frequency unit, wherein a basic time-frequency resource element occupies a positive integer number of consecutive multicarrier symbols corresponding to subcarriers of 480 kHz SCS in time domain and occupies a positive integer number of consecutive subcarriers of 60 KHz SCS in frequency domain.

In one embodiment, a number of time-frequency resources occupied by one of the X time-frequency unit(s) refers to an absolute number of time-frequency resources comprised in the time-frequency unit.

In one embodiment, the X time-frequency unit(s) belongs (belong) to a fourth time window, the first measurement is performed in a fifth time window, an end time for the fourth time window is no later than a start time for the fifth time window, and an end time for the fifth time window is no later than a start time for transmission of the first radio signal.

In one embodiment, the first measurement and any of the X measurement(s) are two types of measurements.

In one embodiment, the first measurement is a measurement on Channel Busy Ratio (CBR).

In one embodiment, the first measurement is a measurement on Channel Busy Quantity (CBQ).

In one embodiment, the first measurement is used for determining a channel occupancy status of the channel(s) measured.

In one embodiment, the first measurement is used for determining a channel occupancy status within the frequency range measured.

In one embodiment, a second-type measurement value is a Channel Busy Ratio (CBR) value.

In one embodiment, a second-type measurement value is a Channel Busy Quantity (CBQ) value.

In one embodiment, each of X1 first-type measurement value(s) out of the X first-type measurement value(s) is greater than a threshold, the second-type measurement value acquired by performing the first measurement is equal to a ratio of the X1 to the X, the X1 is a non-negative integer not greater than the X; for a given SCS, the threshold is configurable, or the threshold is fixed.

In one embodiment, each of X1 first-type measurement value(s) out of the X first-type measurement value(s) is greater than a threshold, the second-type measurement value acquired by performing the first measurement is equal to the X1, the X1 is a non-negative integer not greater than the X, for a given SCS, the threshold is configurable, or the threshold is fixed.

In one embodiment, the first radio signal is transmitted via Sidelink.

In one embodiment, the first radio signal is transmitted via a PC5 interface.

In one embodiment, the first radio signal is unicast.

In one embodiment, the first radio signal is groupcast.

In one embodiment, the first radio signal is broadcast.

In one embodiment, the first radio signal carries a Transport Block (TB).

In one embodiment, the first radio signal is transmitted through a data channel.

In one embodiment, the first radio signal is transmitted through a control channel.

In one embodiment, the first radio signal comprises both a data signal and a control channel.

In one embodiment, the first radio signal is transmitted through a Sidelink Shared Channel (SL-SCH).

In one embodiment, the first radio signal is transmitted through a Physical Sidelink Shared Channel (PSSCH).

In one embodiment, the first radio signal is transmitted through a Physical Sidelink Control Channel (PSCCH).

In one embodiment, the first radio signal carries Sidelink Control Information (SCI).

In one embodiment, the first radio signal carries both SCI and a TB.

In one embodiment, the first radio signal carries Scheduling Assignment (SA) information.

In one embodiment, the first radio signal comprises an initial transmission of a TB.

In one embodiment, the first radio signal comprises a retransmission of a TB.

In one embodiment, the first radio signal is generated after a TB is sequentially subjected to CRC Insertion, Channel Coding, Rate Matching, Scrambling, Modulation, Layer Mapping, Precoding, Mapping to Resource Element, OFDM Baseband Signal Generation, and Modulation and Upconversion.

In one embodiment, the first radio signal is generated after a TB is sequentially subjected to CRC Insertion, Channel Coding, Rate Matching, Scrambling, Modulation, Layer Mapping, Precoding, Mapping to Virtual Resource Blocks, Mapping from Virtual to Physical Resource Blocks, OFDM Baseband Signal Generation, and Modulation and Upconversion.

In one embodiment, the first radio signal is generated after a TB is sequentially subjected to CRC Insertion, Segmentation, coding block-level CRC Insertion, Channel Coding, Rate Matching, Concatenation, Scrambling, Modulation, Layer Mapping, Precoding, Mapping to Resource Element, OFDM Baseband Signal Generation, and Modulation and Upconversion.

In one embodiment, the first radio signal is generated after a TB is sequentially subjected to CRC Insertion, Segmentation, coding block-level CRC Insertion, Channel Coding, Rate Matching, Concatenation, Scrambling, Modulation, Layer Mapping, Precoding, Mapping to Virtual Resource Blocks, Mapping from Virtual to Physical Resource Blocks, OFDM Baseband Signal Generation, and Modulation and Upconversion.

In one embodiment, the first radio signal is generated after a TB is sequentially subjected to CRC Insertion, Channel Coding, Rate Matching, Scrambling, Modulation, Layer Mapping, Transform Precoding, Precoding, Mapping to Resource Element, OFDM Baseband Signal Generation, and Modulation and Upconversion In one embodiment, the first radio signal is generated after a TB is sequentially subjected to CRC Insertion, Channel Coding, Rate Matching, Scrambling, Modulation, Layer Mapping, Transform Precoding, Precoding, Mapping to Virtual Resource Blocks, Mapping from Virtual to Physical Resource Blocks, OFDM Baseband Signal Generation, and Modulation and Upconversion.

In one embodiment, the first radio signal is generated after a TB is sequentially subjected to CRC Insertion, Segmentation, coding block-level CRC Insertion, Channel Coding, Rate Matching, Concatenation, Scrambling, Modulation, Layer Mapping, Transform Precoding, Precoding, Mapping to Resource Element, OFDM Baseband Signal Generation, and Modulation and Upconversion.

In one embodiment, the first radio signal is generated after a TB is sequentially subjected to CRC Insertion, Segmentation, coding block-level CRC Insertion, Channel Coding, Rate Matching, Concatenation, Scrambling, Modulation, Layer Mapping, Transform Precoding, Precoding, Mapping to Virtual Resource Blocks, Mapping from Virtual to Physical Resource Blocks, OFDM Baseband Signal Generation, and Modulation and Upconversion.

In one embodiment, the first radio signal is generated after a piece of SCI is sequentially subjected to CRC Insertion, Channel Coding, Rate Matching, Scrambling, Modulation, Mapping to Physical Resources, OFDM Baseband Signal Generation, and Modulation and Upconversion.

In one embodiment, the first radio signal is generated after a piece of SCI is sequentially subjected to CRC Insertion, Channel Coding, Rate Matching, Scrambling, Modulation, Transform Precoding, Mapping to Physical Resources, OFDM Baseband Signal Generation, and Modulation and Upconversion.

In one embodiment, the phrase that "the X first-type measurement value(s) is(are) used for the first measurement" refers to: The X first-type measurement value(s) is(are) used in the process of performing the first measurement.

In one embodiment, the phrase that "the X first-type measurement value(s) is(are) used for the first measurement" refers to: The X first-type measurement value(s) is(are) used as an input to the first measurement.

In one embodiment, the phrase that "the X first-type measurement value(s) is(are) used for the first measurement" refers to: The first measurement is related to the X first-type measurement value(s).

In one embodiment, the phrase that "a second-type measurement value acquired by performing the first measurement is used for determining at least one of an MCS employed by the first radio signal or time-frequency resources occupied by the first radio signal" comprises that: the second-type measurement value acquired by performing the first measurement is used for determining an MCS employed by the first radio signal and time-frequency resources occupied by the first radio signal.

In one embodiment, the phrase that "a second-type measurement value acquired by performing the first measurement is used for determining at least one of an MCS employed by the first radio signal or time-frequency resources occupied by the first radio signal" comprises that: the second-type measurement value acquired by performing the first measurement is used for determining an MCS employed by the first radio signal.

In one embodiment, the phrase that "a second-type measurement value acquired by performing the first measurement is used for determining at least one of an MCS employed by the first radio signal or time-frequency resources occupied by the first radio signal" comprises that: the second-type measurement value acquired by performing the first measurement is used for determining time-frequency resources occupied by the first radio signal.

In one embodiment, the phrase that "a second-type measurement value acquired by performing the first measurement is used for determining at least one of an MCS employed by the first radio signal or time-frequency resources occupied by the first radio signal" comprises that: the second-type measurement value acquired by performing the first measurement is used for determining at least one of an MCS employed by the first radio signal or time-frequency resources occupied by the first radio signal based on a given mapping relation.

In one embodiment, the phrase that "a second-type measurement value acquired by performing the first measurement is used for determining at least one of an MCS employed by the first radio signal or time-frequency resources occupied by the first radio signal" comprises that: the second-type measurement value acquired by performing the first measurement is used for determining at least one of an MCS employed by the first radio signal or time-frequency resources occupied by the first radio signal based on a given function relation.

In one embodiment, the phrase that "a second-type measurement value acquired by performing the first measurement is used for determining at least one of an MCS employed by the first radio signal or time-frequency resources occupied by the first radio signal" comprises that: the second-type measurement value acquired by performing the first measurement is used for determining at least one of an MCS employed by the first radio signal or time-frequency resources occupied by the first radio signal based on a given correspondence relation.

In one embodiment, the MCS employed by the first radio signal is one of BPSK, Pi/2 BPSK, QPSK, 16QAM, 64QAM, 256QAM, and 1024QAM.

In one embodiment, time-frequency resources occupied by the first radio signal comprises: time domain resources occupied by the first radio signal.

In one embodiment, time-frequency resources occupied by the first radio signal comprises: frequency domain resources occupied by the first radio signal.

In one embodiment, time-frequency resources occupied by the first radio signal comprises: time domain resources and frequency domain resources occupied by the first radio signal.

In one embodiment, for a given SCS and CP length, time-frequency resources occupied by the first radio signal comprises: REs occupied by the first radio signal.

In one embodiment, time-frequency resources occupied by the first radio signal comprises: an absolute number of time-frequency resources occupied by the first radio signal.

In one embodiment, for a given SCS and CP length, time-frequency resources occupied by the first radio signal comprises: a number of REs occupied by the first radio signal.

In one embodiment, for a given SCS and CP length, time-frequency resources occupied by the first radio signal comprises: a number of sub-channels occupied by the first radio signal.

In one embodiment, for a given SCS and CP length, time-frequency resources occupied by the first radio signal comprises: a number of PRBs occupied by the first radio signal.

In one embodiment, an SCS of subcarriers occupied by the first radio signal is one of 15 kHz, 30 kHz, 60 kHz, 120 kHz, 240 kHz, 480 kHz, and 960 kHz.

In one embodiment, an SCS of subcarriers occupied by the first radio signal is equal to a non-negative integer power of 2 times as large as 15 kHz.

In one embodiment, the phrase that "a number of time-frequency resources occupied by a time-frequency unit of the X time-frequency unit(s) is related to a subcarrier spacing of subcarriers occupied by the first radio signal" refers to: the number of time-frequency resources occupied by a time-frequency unit of the X time-frequency unit(s) is related to each subcarrier spacing of subcarriers occupied by the first radio signal.

In one embodiment, the phrase that "a number of time-frequency resources occupied by a time-frequency unit of the X time-frequency unit(s) is related to a subcarrier spacing of subcarriers occupied by the first radio signal" refers to: the subcarrier spacing of subcarriers occupied by the first radio signal is used for determining the number of time-frequency resources occupied by a time-frequency unit of the X time-frequency unit(s).

In one embodiment, the phrase that "a number of time-frequency resources occupied by a time-frequency unit of the X time-frequency unit(s) is related to a subcarrier spacing of subcarriers occupied by the first radio signal" refers to: the number of time-frequency resources occupied by a time-frequency unit of the X time-frequency unit(s) is linear with the subcarrier spacing of subcarriers occupied by the first radio signal.

In one embodiment, the phrase that "a number of time-frequency resources occupied by a time-frequency unit of the X time-frequency unit(s) is related to a subcarrier spacing of subcarriers occupied by the first radio signal" refers to: an absolute number of frequency domain resources occupied by one of the X time-frequency unit(s) is related to the subcarrier spacing of subcarriers occupied by the first radio signal.

In one embodiment, the phrase that "a number of time-frequency resources occupied by a time-frequency unit of the X time-frequency unit(s) is related to a subcarrier spacing of subcarriers occupied by the first radio signal" refers to: an absolute number of frequency domain resources occupied by one of the X time-frequency unit(s) is related to an absolute number of frequency domain resources occupied by a positive integer number of subcarrier(s) occupied by the first radio signal.

In one embodiment, the phrase that "a number of time-frequency resources occupied by a time-frequency unit of the X time-frequency unit(s) is related to a subcarrier spacing of subcarriers occupied by the first radio signal" refers to: a length of frequency interval of frequency domain resources occupied by one of the X time-frequency unit(s) is related to a subcarrier spacing of subcarriers occupied by the first radio signal.

In one embodiment, the phrase that "a number of time-frequency resources occupied by a time-frequency unit of the X time-frequency unit(s) is related to a subcarrier spacing of subcarriers occupied by the first radio signal" refers to: an absolute number of time domain resources occupied by one of the X time-frequency unit(s) is related to the subcarrier spacing of subcarriers occupied by the first radio signal.

In one embodiment, the phrase that "a number of time-frequency resources occupied by a time-frequency unit of the X time-frequency unit(s) is related to a subcarrier spacing of subcarriers occupied by the first radio signal" refers to: an absolute number of time domain resources occupied by one of the X time-frequency unit(s) is related to an absolute number of time domain resources occupied by a positive integer number of multicarrier symbol(s) corresponding to subcarrier(s) occupied by the first radio signal.

In one embodiment, the phrase that "a number of time-frequency resources occupied by a time-frequency unit of the X time-frequency unit(s) is related to a subcarrier spacing of subcarriers occupied by the first radio signal" refers to: a length of time interval of time domain resources occupied by one of the X time-frequency unit(s) is related to a subcarrier spacing of subcarriers occupied by the first radio signal.

In one embodiment, the phrase that "a number of time-frequency resources occupied by a time-frequency unit of the X time-frequency unit(s) is related to a subcarrier spacing of subcarriers occupied by the first radio signal" refers to: a subcarrier spacing of subcarriers occupied by the first radio signal belongs to one of M SCS sets, the M SCS sets respectively correspond to M candidate time-frequency resource numbers, and a number of time-frequency resources occupied by one of the X time-frequency unit(s) is one of the M candidate time-frequency resource numbers, a candidate time-frequency resource number corresponding to one of the M SCS sets to which the subcarrier spacing of subcarriers occupied by the first radio signal belongs to is the number of time-frequency resources occupied by one of the X time-frequency unit(s), the M is a positive integer greater than 1.

In one embodiment, the phrase that "a number of time-frequency resources occupied by a time-frequency unit of the X time-frequency unit(s) is related to a subcarrier spacing of subcarriers occupied by the first radio signal" refers to: a frequency range covering a carrier to which the first radio signal belongs to in frequency domain is used for determining the number of time-frequency resources occupied by one of the X time-frequency unit(s), a subcarrier spacing of subcarriers occupied by the first radio signal belongs to one of M SCS sets, and a frequency range covering a carrier to which the first radio signal belongs to in frequency domain is also used for determining a candidate SCS set to which the subcarrier spacing of subcarriers occupied by the first radio signal belongs to out of the M SCS sets, the M is a positive integer greater than 1, the M SCS sets are pre-defined.

In one embodiment, the phrase that "a number of time-frequency resources occupied by a time-frequency unit of the X time-frequency unit(s) is related to a subcarrier spacing of subcarriers occupied by the first radio signal" refers to: if a frequency range covering a carrier to which the first radio signal belongs to in frequency domain is lower than 6 GHz (FR1), the number of time-frequency resources occupied by one of the X time-frequency unit(s) is equal to a first number, the subcarrier spacing of subcarriers occupied by the first radio signal belongs to one of 15 kHz, 30 kHz, and 60 kHz; if a frequency range covering a carrier to which the first radio signal belongs to in frequency domain is higher than 6 GHz (FR2), the number of time-frequency resources occupied by one of the X time-frequency unit(s) is equal to a second number, the subcarrier spacing of subcarriers occupied by the first radio signal belongs to one of 60 kHz, 120 kHz, and 240 kHz; the first number and the second number are not equal.

In one embodiment, the phrase that "a number of time-frequency resources occupied by a time-frequency unit of the X time-frequency unit(s) is related to a subcarrier spacing of subcarriers occupied by the first radio signal" refers to: if a frequency range covering a carrier to which the first radio signal belongs to in frequency domain is lower than 6 GHz (FR1), the number of time-frequency resources occupied by one of the X time-frequency unit(s) is equal to a first number, the subcarrier spacing of subcarriers occupied by the first radio signal belongs to one of 15 kHz, 30 kHz, and 60 kHz; if a frequency range covering a carrier to which the first radio signal belongs to in frequency domain is higher than 6 GHz (FR2), the number of time-frequency resources occupied by one of the X time-frequency unit(s) is equal to a second number, the subcarrier spacing of subcarriers occupied by the first radio signal belongs to one of 60 kHz, 120 kHz, 240 kHz, 480 kHz, and 960 kHz; the first number and the second number are unequal.

Embodiment 2

Figure 2:
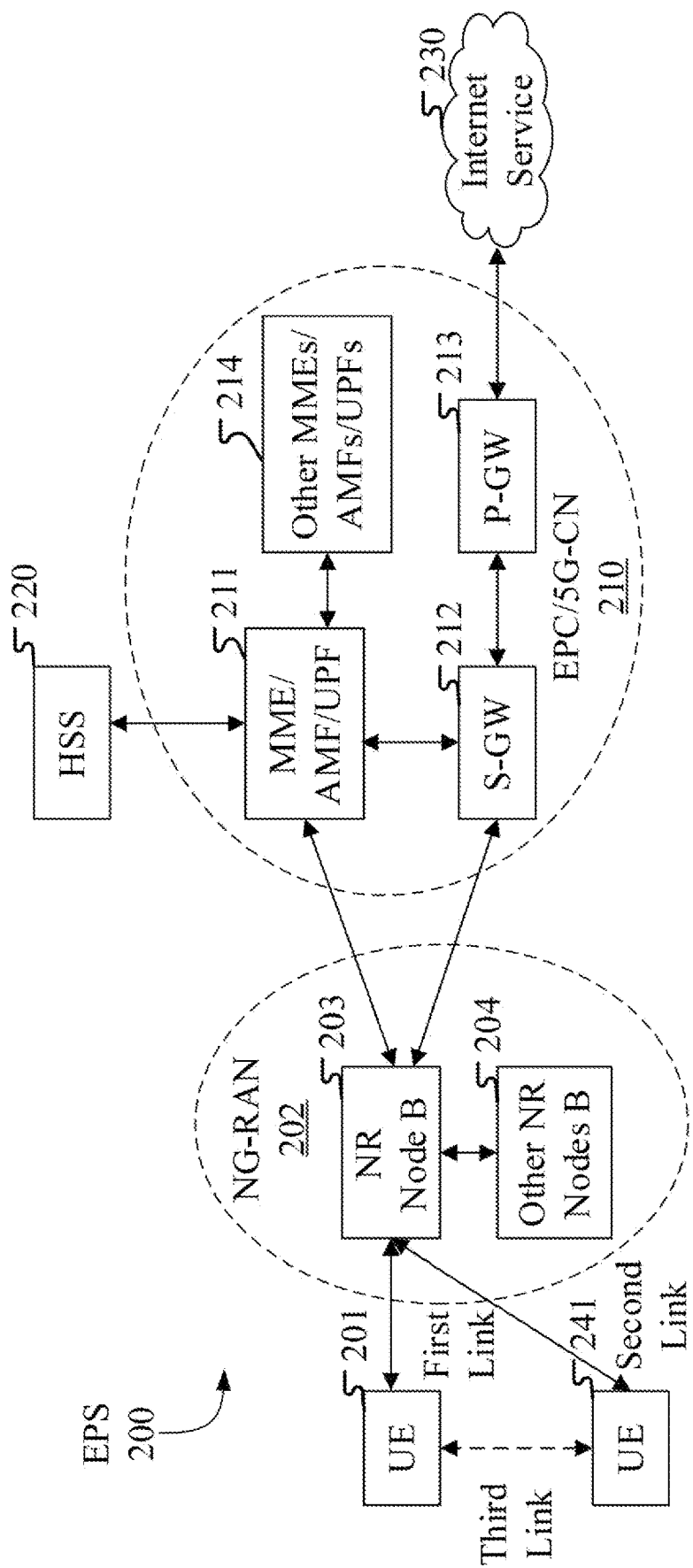
FIG. 2 illustrates a schematic diagram of a network architecture according to one embodiment of the present disclosure.

Embodiment 2 illustrates a schematic diagram of a network architecture according to the present disclosure, as shown in FIG. 2. FIG. 2 is a is a diagram illustrating a network architecture 200 of NR 5G, Long-Term Evolution (LTE) and Long-Term Evolution Advanced (LTE-A) systems. The NR 5G or LTE network architecture 200 may be called an Evolved Packet System (EPS) 200. The EPS 200 may comprise one or more UEs 201, an NG-RAN 202, an Evolved Packet Core/5G-Core Network (EPC/5G-CN) 210, a Home Subscriber Server (HSS) 220 and an Internet Service 230. The EPS 200 may be interconnected with other access networks. For simple description, the entities/interfaces are not shown. As shown in FIG. 2, the EPS 200 provides packet switching services. Those skilled in the art will find it easy to understand that various concepts presented throughout the present disclosure can be extended to networks providing circuit switching services or other cellular networks. The NG-RAN 202 comprises an NR node B (gNB) 203 and other gNBs 204. The gNB 203 provides UE 201 oriented user plane and control plane terminations. The gNB 203 may be connected to other gNBs 204 via an Xn interface (for example, backhaul). The gNB 203 may be called a base station, a base transceiver station, a radio base station, a radio transceiver, a transceiver function, a Base Service Set (BSS), an Extended Service Set (ESS), a Transmitter Receiver Point (TRP) or some other applicable terms. In V2X networks, the gNB 203 may be a base station, a ground base station relayed by satellites or a Road Side Unit (RSU). The gNB 203 provides an access point of the EPC/5G-CN 210 for the UE 201. Examples of UE 201 include cellular phones, smart phones, Session Initiation Protocol (SIP) phones, laptop computers, Personal Digital Assistant (PDA), Satellite Radios, Global Positioning Systems (GPSs), multimedia devices, video devices, digital audio players (for example, MP3 players), cameras, games consoles, unmanned aerial vehicles, air vehicles, narrowband physical network equipment, machine-type communication equipment, land vehicles, automobiles, vehicle-mounted communication units, wearable equipment, or any other devices having similar functions. Those skilled in the art also can call the UE 201 a mobile station, a subscriber station, a mobile unit, a subscriber unit, a wireless unit, a remote unit, a mobile device, a wireless device, a radio communication device, a remote device, a mobile subscriber station, an access terminal, a mobile terminal, a wireless terminal, a remote terminal, a handset, a user proxy, a mobile client, a client, a vehicle terminal, V2X equipment or some other appropriate terms. The gNB 203 is connected to the EPC/5G-CN 210 via an S1/NG interface. The EPC/5G-CN 210 comprises an MME/AMF/UPF 211, other MMEs/AMFs/UPFs 214, a Service Gateway (S-GW) 212 and a Packet Date Network Gateway (P-GW) 213. The MME/AMF/UPF 211 is a control node for processing a signaling between the UE 201 and the EPC/5G-CN 210. Generally, the MME/AMF/UPF 211 provides bearer and connection management. All user Internet Protocol (IP) packets are transmitted through the S-GW 212, the S-GW 212 is connected to the P-GW 213. The P-GW 213 provides UE IP address allocation and other functions. The P-GW 213 is connected to the Internet Service 230. The Internet Service 230 comprises IP services corresponding to operators, specifically including Internet, Intranet, IP Multimedia Subsystem (IMS) and Packet Switching Streaming (PSS) services.

In one embodiment, the UE 201 corresponds to the first-type communication node in the present disclosure.

In one embodiment, the UE 201 supports Sidelink transmission.

In one embodiment, the UE 201 supports a PC5 interface.

In one embodiment, the UE 201 supports Vehicle-to-Everything.

In one embodiment, the UE 201 supports V2X business.

In one embodiment, the gNB 203 corresponds to the second-type communication node.

In one embodiment, the gNB 203 supports Vehicle-to-Everything.

In one embodiment, the gNB 203 supports V2X business.

Embodiment 3

Figure 3:
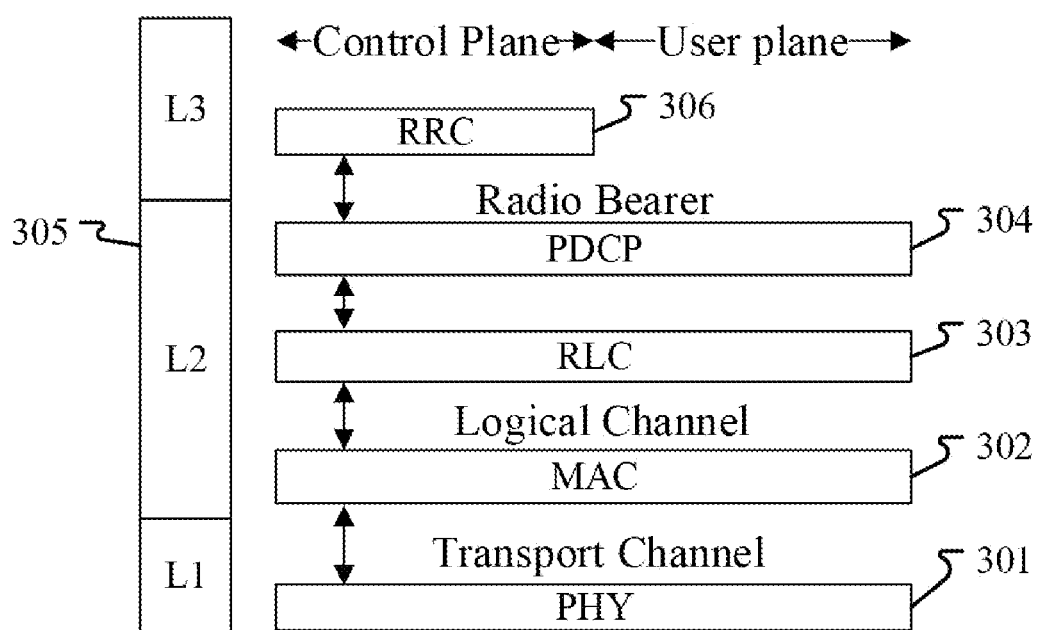
FIG. 3 illustrates a schematic diagram of a radio protocol architecture of a user plane and a control plane according to one embodiment of the present disclosure.

Embodiment 3 illustrates a schematic diagram of an embodiment of a radio protocol architecture of a user plane and a control plane according to the present disclosure, as shown in FIG. 3. FIG. 3 is a schematic diagram illustrating an embodiment of a radio protocol architecture of a user plane and a control plane. In FIG. 3, the radio protocol architecture between a first-type communication node (UE) and a second-type communication node (gNB, eNB or RSU in V2X), or between two first-type communication nodes (UE) is represented by three layers, which are a layer 1, a layer 2 and a layer 3, respectively. The layer 1 (L1) is the lowest layer and performs signal processing functions of PHY layers. The L1 is called PHY 301 in the present disclosure. The layer 2 (L2) 305 is above the PHY 301, and is in charge of the link between the first-type communication node and the second-type communication node, and a link between two first-type communication nodes via the PHY 301. In the user plane, L2 305 comprises a Medium Access Control (MAC) sublayer 302, a Radio Link Control (RLC) sublayer 303 and a Packet Data Convergence Protocol (PDCP) sublayer 304. All the three sublayers terminate at the second-type communication node of the network side. Although not described in FIG. 3, the UE may comprise several higher layers above the L2 305, such as a network layer (i.e., IP layer) terminated at a P-GW 213 of the network side and an application layer terminated at the other side of the connection (i.e., a peer UE, a server, etc.). The PDCP sublayer 304 provides multiplexing among variable radio bearers and logical channels. The PDCP sublayer 304 also provides a header compression for a higher-layer packet so as to reduce a radio transmission overhead. The PDCP sublayer 304 provides security by encrypting a packet and provides support for handover of the first-type communication node between second-type communication nodes. The RLC sublayer 303 provides segmentation and reassembling of a higher-layer packet, retransmission of a lost packet, and reordering of a packet so as to compensate the disordered receiving caused by HARQ. The MAC sublayer 302 provides multiplexing between a logical channel and a transport channel. The MAC sublayer 302 is also responsible for allocating between first-type communication nodes various radio resources (i.e., resources block) in a cell. The MAC sublayer 302 is also in charge of HARQ operation. In the control plane, the radio protocol architecture of the first-type communication node and the second-type communication node is almost the same as the radio protocol architecture in the user plane on the PHY 301 and the L2 305, but there is no header compression for the control plane. The control plane also comprises a Radio Resource Control (RRC) sublayer 306 in the layer 3 (L3). The RRC sublayer 306 is responsible for acquiring radio resources (i.e., radio bearer) and configuring the lower layer using an RRC signaling between the second-type communication node and the first-type communication node.

In one embodiment, the radio protocol architecture in FIG. 3 is applicable to the first-type communication node in the present disclosure.

In one embodiment, the radio protocol architecture in FIG. 3 is applicable to the second-type communication node in the present disclosure.

In one embodiment, the X first-type measurement value(s) in the present disclosure is(are) acquired on the RRC sublayer 306.

In one embodiment, the X first-type measurement value(s) in the present disclosure is(are) acquired on the MAC sublayer 302.

In one embodiment, the X first-type measurement value(s) in the present disclosure is(are) acquired on the PHY 301.

In one embodiment, the second-type measurement value in the present disclosure is acquired on the RRC sublayer 306.

In one embodiment, the second-type measurement value in the present disclosure is acquired on the MAC sublayer 302.

In one embodiment, the second-type measurement value in the present disclosure is acquired on the PHY 301.

In one embodiment, the first radio signal in the present disclosure is generated by the RRC sublayer 306.

In one embodiment, the first radio signal in the present disclosure is generated by the MAC sublayer 302.

one embodiment, the first radio signal in the present disclosure is generated by the PHY 301.

In one embodiment, the Y third-type measurement value(s) in the present disclosure is(are) acquired on the RRC sublayer 306.

In one embodiment, the Y third-type measurement value(s) in the present disclosure is(are) acquired on the MAC sublayer 302.

In one embodiment, the Y third-type measurement value(s) in the present disclosure is(are) acquired on the PHY 301.

In one embodiment, the first information in the present disclosure is generated by the RRC sublayer 306.

In one embodiment, the first information in the present disclosure is generated by the MAC sublayer 302.

In one embodiment, the first information in the present disclosure is generated by the PHY 301.

In one embodiment, the second information in the present disclosure is generate by the RRC sublayer 306.

In one embodiment, the second information in the present disclosure is generate by the MAC sublayer 302.

In one embodiment, the second information in the present disclosure is generate by the PHY 301.

In one embodiment, the third information in the present disclosure is generated by the RRC sublayer 306.

In one embodiment, the third information in the present disclosure is generated by the MAC sublayer 302.

In one embodiment, the third information in the present disclosure is generated by the PHY 301.

In one embodiment, the first signaling in the present disclosure is generated by the RRC sublayer 306.

In one embodiment, the first signaling in the present disclosure is generated by the PHY 301.

Embodiment 4

Figure 4:
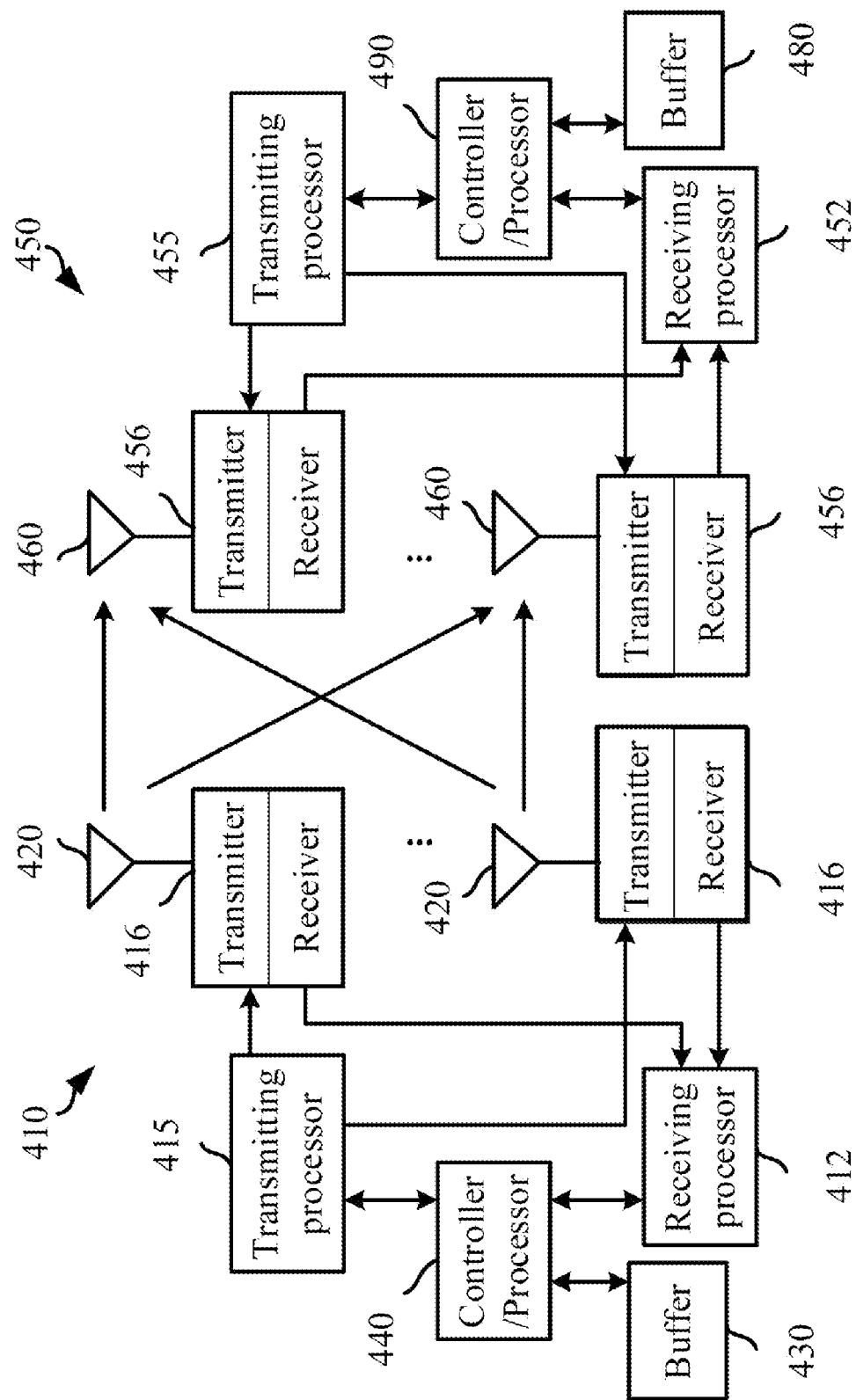
FIG. 4 illustrates a schematic diagram of a first-type communication node and a second-type communication node according to one embodiment of the present disclosure.

Embodiment 4 illustrates a schematic diagram of a first-type communication node and a second-type communication node according to the present disclosure, as shown in FIG. 4.

The first-type communication node (450) comprises a controller/processor 490, a memory 480, a receiving processor 452, a transmitter/receiver 456, a transmitting processor 455 and a data source 467, wherein the transmitter/receiver 456 comprises an antenna 460. The data source 467 provides a higher-layer packet to the controller/processor 490, the controller/processor 490 provides header compression and decompression, encryption and decryption, packet segmentation and reordering and multiplexing and demultiplexing between a logical channel and a transport channel so as to implement the L2 layer protocols used for the user plane and the control plane. The higher layer packet may comprise data or control information, such as DL-SCH, UL-SCH or SL-SCH. The transmitting processor 455 performs various signal transmitting processing functions of the L1 layer (that is, PHY), including coding, interleaving, scrambling, modulation, power control/allocation, precoding and physical layer signaling generation. The receiving processor 452 performs various signal receiving processing functions of the L1 layer (that is, PHY), including decoding, de-interleaving, descrambling, demodulation, de-precoding and physical layer control signaling extraction. The transmitter 456 is configured to convert a baseband signal provided by the transmitting processor 455 into a radio frequency (RF) signal to be transmitted via the antenna 460, the receiver 456 is configured to convert the RF signal received via the antenna 460 into a baseband signal to be provided to the receiving processor 452.

The second-type communication node (410) may comprise a controller/processor 440, a memory 430, a receiving processor 412, a transmitter/receiver 416 and a transmitting processor 415, wherein the transmitter/receiver 416 comprises an antenna 420. A higher layer packet is provided to the controller/processor 440, the controller/processor 440 provides header compression and decompression, encryption and decryption, packet segmentation and reordering and multiplexing and demultiplexing between a logical channel and a transport channel, so as to implement the L2 layer protocols used for the user plane and the control plane. The higher layer packet may comprise data or control information, such as DL-SCH or UL-SCH. The transmitting processor 415 performs various signal transmitting processing functions of the L1 layer (that is, PHY), including coding, interleaving, scrambling, modulation, power control/allocation, precoding and physical layer signaling (i.e., synchronization signal, reference signal, etc.) generation. The receiving processor 412 performs various signal receiving processing functions of the L1 layer (that is, PHY), including decoding, de-interleaving, descrambling, demodulation, de-precoding and physical layer signaling extraction. The transmitter 416 is configured to convert a baseband signal provided by the transmitting processor 415 into a RF signal to be transmitted via the antenna 420, the receiver 416 is configured to convert the RF signal received via the antenna 420 into a baseband signal to be provided to the receiving processor 412.

In Downlink (DL) transmission, a higher layer packet (for example, first information, second information and third information in the present disclosure) is provided to the controller/processor 440. The controller/processor 440 implements the functionality of the L2 layer. In DL transmission, the controller/processor 440 provides header compression, encryption, packet segmentation and reordering and multiplexing between a logical channel and a transport channel, as well as radio resource allocation for the first-type communication node 450 based on varied priorities. The controller/processor 440 is also in charge of HARQ operation, retransmission of a lost packet, and a signaling to the first-type communication node 450, for instance, the first information, the second information and the third information in the present disclosure are all generated in the controller/processor 440. The transmitting processor 415 performs signal processing functions of the L1 layer (that is, PHY), including coding, interleaving, scrambling, modulation, power control/allocation, precoding and physical layer control signaling generation. Generation of physical layer signals carrying the first information, the second information and the third information of the present disclosure is performed in the transmitting processor 415. Modulated signals are divided into parallel streams and each stream is mapped onto corresponding multicarrier subcarriers and/or multicarrier symbols, which are then mapped from the transmitting processor 415 to the antenna 420 via the transmitter 416 to be transmitted in the form of RF signals. Corresponding channels of the first information, the second information and the third information of the present disclosure on physical layer are mapped from the transmitting processor 415 to target radio resources and then mapped from the transmitter 416 to the antenna 420 to be transmitted in the form of RF signals. At the receiving side, each receiver 456 receives an RF signal via a corresponding antenna 460, each receiver 456 recovers baseband information modulated to the RF carrier and provides the baseband information to the receiving processor 452. The receiving processor 452 performs signal receiving processing functions of the L1 layer. The signal receiving processing functions include reception of physical layer signals carrying the first information, the second information and the third information of the present disclosure, demodulation of multicarrier symbols in multicarrier symbol streams based on each modulation scheme (e.g., BPSK, QPSK), and then descrambling, decoding and de-interleaving of the demodulated symbols so as to recover data or control signals transmitted by the second-type communication node 410 on a physical channel, and the data or control signals are later provided to the controller/processor 490. The controller/processor 490 implements the functionality of the L2 layer, the controller/processor 490 interprets the first information, the second information and the third information of the present disclosure. The controller/processor 490 may be connected to the memory 480 that stores program codes and data. The memory 480 can be called a computer readable medium.

In one embodiment, the first-type communication node 450 comprises at least one processor and at least one memory, the at least one memory comprises computer program codes; the at least one memory and the computer program codes are configured to be used in collaboration with the at least one processor, the first-type communication node 450 at least performs X measurement(s) respectively in X time-frequency unit(s), the X measurement(s) respectively being used for acquiring X first-type measurement value(s), the X being a positive integer; performs a first measurement, the first measurement being used for acquiring a second-type measurement value; and transmits a first radio signal; herein, the X first-type measurement value(s) is(are) used for the first measurement, a second-type measurement value acquired by performing the first measurement is used for determining at least one of an MCS employed by the first radio signal or time-frequency resources occupied by the first radio signal; a number of time-frequency resources occupied by a time-frequency unit of the X time-frequency unit(s) is related to a subcarrier spacing of subcarriers occupied by the first radio signal.

In one embodiment, the first-type communication node 450 comprises a memory that stores computer readable instruction program, the computer readable instruction program generates an action when executed by at least one processor, the action includes: performing X measurement(s) respectively in X time-frequency unit(s), the X measurement(s) respectively being used for acquiring X first-type measurement value(s), the X being a positive integer; performing a first measurement, the first measurement being used for acquiring a second-type measurement value; and transmitting a first radio signal; herein, the X first-type measurement value(s) is(are) used for the first measurement, a second-type measurement value acquired by performing the first measurement is used for determining at least one of an MCS employed by the first radio signal or time-frequency resources occupied by the first radio signal; a number of time-frequency resources occupied by a time-frequency unit of the X time-frequency unit(s) is related to a subcarrier spacing of subcarriers occupied by the first radio signal.

In one embodiment, the second-type communication node 410 comprises at least one processor and at least one memory, the at least one memory comprises computer program codes; the at least one memory and the computer program codes are configured to be used in collaboration with the at least one processor. The second-type communication node 450 at least transmits first information; herein, X measurement(s) respectively performed in X time-frequency unit(s) is(are) respectively used for acquiring X first-type measurement value(s), the X is a positive integer; the X first-type measurement value(s) is(are) used for a first measurement, the first measurement is used for acquiring a second-type measurement value, the second-type measurement value acquired by performing the first measurement is used for determining at least one of an MCS employed by the first radio signal or time-frequency resources occupied by the first radio signal; a number of time-frequency resources occupied by a time-frequency unit of the X time-frequency unit(s) is related to a subcarrier spacing of subcarriers occupied by the first radio signal; each of X1 first-type measurement value(s) out of the X first-type measurement value(s) is greater than a target threshold, the second-type measurement value acquired by performing the first measurement is equal to a ratio of the X1 to the X, the X1 is a non-negative integer not greater than the X, the first information is used for determining the target threshold.

In one embodiment, the second-type communication node 410 comprises a memory that stores computer readable instruction program, the computer readable instruction program generates an action when executed by at least one processor, the action includes: transmitting first information; herein, X measurement(s) respectively performed in X time-frequency unit(s) is(are) respectively used for acquiring X first-type measurement value(s), the X is a positive integer; the X first-type measurement value(s) is(are) used for a first measurement, the first measurement is used for acquiring a second-type measurement value, the second-type measurement value acquired by performing the first measurement is used for determining at least one of an MCS employed by the first radio signal or time-frequency resources occupied by the first radio signal; a number of time-frequency resources occupied by a time-frequency unit of the X time-frequency unit(s) is related to a subcarrier spacing of subcarriers occupied by the first radio signal; each of X1 first-type measurement value(s) out of the X first-type measurement value(s) is greater than a target threshold, the second-type measurement value acquired by performing the first measurement is equal to a ratio of the X1 to the X, the X1 is a non-negative integer not greater than the X, the first information is used for determining the target threshold.

In one embodiment, the receiver 456 (including the antenna 460), the receiving processor 452 and the controller/processor 490 are used for receiving the first information in the present disclosure.

In one embodiment, the receiver 456 (including the antenna 460), the receiving processor 452 and the controller/processor 490 are used for receiving the second information in the present disclosure.

In one embodiment, the receiver 456 (including the antenna 460), the receiving processor 452 and the controller/processor 490 are used for receiving the third information in the present disclosure.

In one embodiment, the transmitter 416 (including the antenna 420), the transmitting processor and the controller/processor 440 are used for transmitting the first information in the present disclosure.

In one embodiment, the transmitter 416 (including the antenna 420), the transmitting processor and the controller/processor 440 are used for transmitting the second information in the present disclosure.

In one embodiment, the transmitter 416 (including the antenna 420), the transmitting processor and the controller/processor 440 are used for transmitting the third information in the present disclosure.

Embodiment 5

Figure 5:
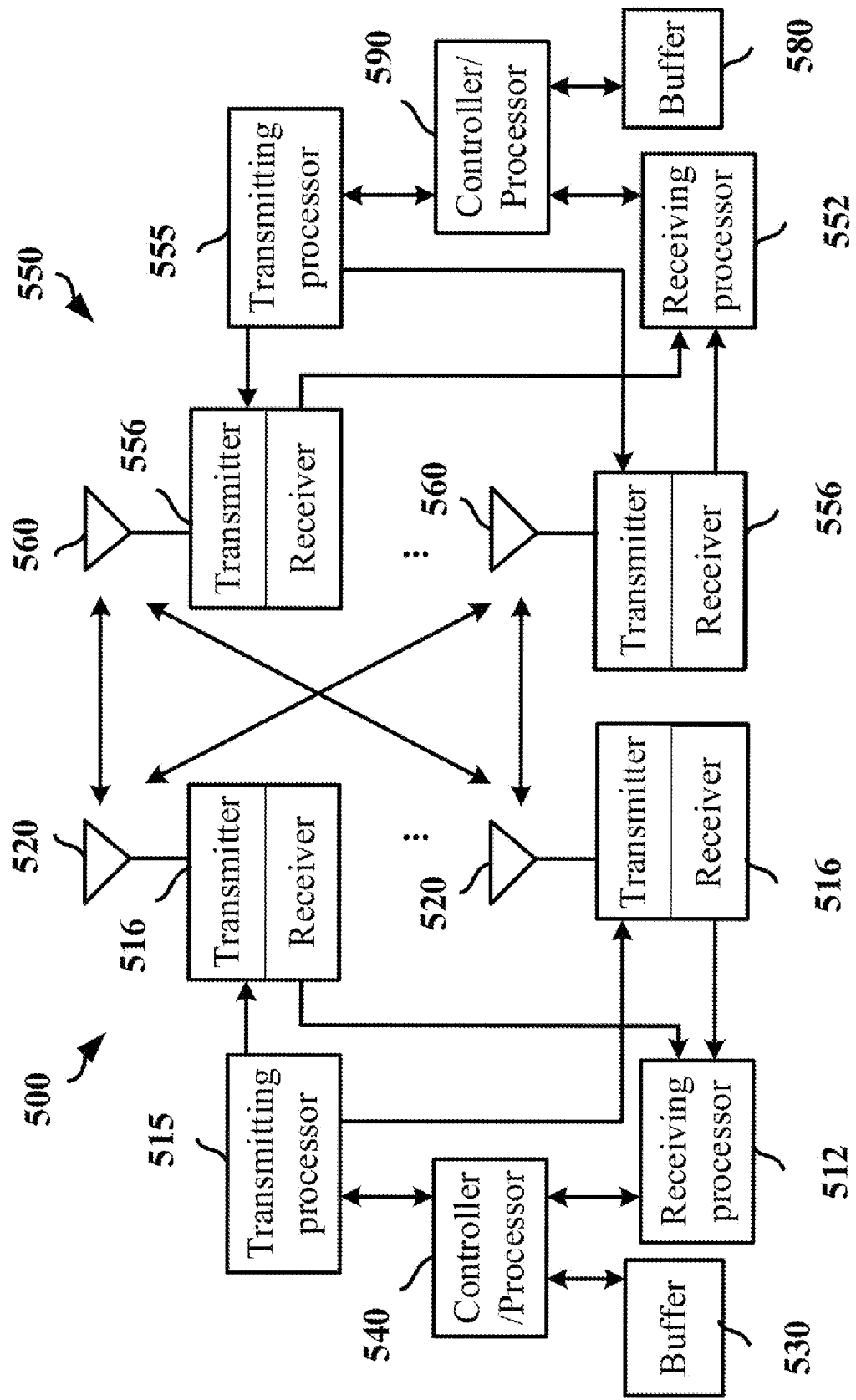
FIG. 5 illustrates a schematic diagram of two first-type communication nodes according to one embodiment of the present disclosure.

Embodiment 5 illustrates a schematic diagram of two first-type communication nodes according to one embodiment of the present disclosure, as shown in FIG. 5.

A first-type communication node (550) comprises a controller/processor 590, a memory 580, a receiving processor 552, a transmitter/receiver 556, a transmitting processor 555 and a data source 567, wherein the transmitter/receiver 556 comprises an antenna 560. The data source 567 provides a higher layer packet to the controller/processor 590, the controller/processor 590 provides header compression and decompression, encryption and decryption, packet segmentation and reordering and multiplexing and demultiplexing between a logical channel and a transport channel so as to implement protocols of the L2 layer. The higher layer packet may comprise data or control information, such as SL-SCH. The transmitting processor 555 performs various signal transmitting processing functions of the L1 layer (i.e., PHY), including coding, interleaving, scrambling, modulation, power control/allocation, precoding and physical layer control signaling generation. The receiving processor 552 performs various signal receiving processing functions of the L1 layer (i.e., PHY), including decoding, de-interleaving, descrambling, demodulation, de-precoding and physical layer control signaling extraction. The transmitter 556 is configured to convert a baseband signal provided by the transmitting processor 555 into an RF signal to be transmitted via the antenna 560, the receiver 556 is configured to convert the RF signal received via the antenna 560 into a baseband signal to be provided to the receiving processor 552. The composition of another first-type communication node (500) is the same as that of the first-type communication node 550.

In sidelink transmission, a higher layer packet (e.g., the first radio signal in the present disclosure) is provided to the controller/processor 540, the controller/processor 540 implements the functionality of the L2 layer. In sidelink transmission, the controller/processor 540 provides header compression, encryption, packet segmentation and reordering, and multiplexing between a logical channel and a transport channel. The controller/processor 540 is also responsible for HARQ operation (if supportive), repeated transmission, and a signaling to the first-type communication node 550. The transmitting processor 515 performs various signal processing functions of the L1 layer (that is, PHY), including coding, interleaving, scrambling, modulation, power control/allocation, precoding and physical layer control signaling generation. Generation of a physical layer signal carrying the first signaling of the present disclosure is performed in the transmitting processor 515. Modulated signals are divided into parallel streams and each stream is mapped onto corresponding multicarrier subcarriers and/or multicarrier symbols, which are then mapped from the transmitting processor 515 to the antenna 520 via the transmitter 516 to be transmitted in the form of RF signals. At the receiving side, each receiver 556 receives an RF signal via a corresponding antenna 560, each receiver 556 recovers baseband information modulated to the RF carrier and provides the baseband information to the receiving processor 552. The receiving processor 552 performs signal receiving processing functions of the L1 layer. The signal receiving processing functions include reception of physical layer signals carrying the first signaling and the first radio signal of the present disclosure, demodulation of multicarrier symbols in multicarrier symbol streams based on each modulation scheme (e.g., BPSK, QPSK), and then descrambling, decoding and de-interleaving of the demodulated symbols so as to recover data or control signals transmitted by the first-type communication node 500 on a physical channel, and the data or control signals are later provided to the controller/processor 590. The controller/processor 590 implements the functionality of the L2 layer, the controller/processor 590 interprets the first radio signal of the present disclosure. The controller/processor 590 may be connected to the memory 580 that stores program codes and data. The memory 580 can be called a computer readable medium. Particularly, in the first-type communication node 500, RF signals measured by the X first-type measurement(s) in the present disclosure are received by the receiver 516, and are then subjected to processing and measurement by the receiving processor 512, after that these signals are provided to the controller/processor 540 for filtering. The controller/processor 540 performs the first measurement in the present disclosure according to result of X first-type measurement(s). The Y measurement(s) of the present disclosure is(are) performed in the controller/processor 540.

In one embodiment, the first-type communication node (500) comprises at least one processor and at least one memory, the at least one memory comprises computer program codes; the at least one memory and the computer program codes are configured to be used in collaboration with the at least one processor. The first-type communication node (500) at least performs X measurement(s) respectively in X time-frequency unit(s), the X measurement(s) respectively being used for acquiring X first-type measurement value(s), the X being a positive integer; performs a first measurement, the first measurement being used for acquiring a second-type measurement value; and transmits a first radio signal; herein, the X first-type measurement value(s) is(are) used for the first measurement, a second-type measurement value acquired by performing the first measurement is used for determining at least one of an MCS employed by the first radio signal or time-frequency resources occupied by the first radio signal; a number of time-frequency resources occupied by a time-frequency unit of the X time-frequency unit(s) is related to a subcarrier spacing of subcarriers occupied by the first radio signal.

In one embodiment, the first-type communication node (500) comprises a memory that stores computer readable instruction program, the computer readable instruction program generates an action when executed by at least one processor, the action includes: performing X measurement(s) respectively in X time-frequency unit(s), the X measurement(s) respectively being used for acquiring X first-type measurement value(s), the X being a positive integer; performing a first measurement, the first measurement being used for acquiring a second-type measurement value; and transmitting a first radio signal; herein, the X first-type measurement value(s) is(are) used for the first measurement, a second-type measurement value acquired by performing the first measurement is used for determining at least one of an MCS employed by the first radio signal or time-frequency resources occupied by the first radio signal; a number of time-frequency resources occupied by a time-frequency unit of the X time-frequency unit(s) is related to a subcarrier spacing of subcarriers occupied by the first radio signal.

In one embodiment, the receiver 556 (including the antenna 560), the receiving processor 552 and the controller/processor 590 are used for receiving the first radio signal in the present disclosure.

In one embodiment, the receiver 556 (including the antenna 560), the receiving processor 552 and the controller/processor 590 are used for receiving the first signaling in the present disclosure.

In one embodiment, the transmitter 516 (including the antenna 520), the transmitting processor 515 and the controller/processor 540 are used for transmitting the first radio signal in the present disclosure.

In one embodiment, the transmitter 516 (including the antenna 520), the transmitting processor 515 and the controller/processor 540 are used for transmitting the first signaling in the present disclosure.

In one embodiment, the receiver 516 (including the antenna 520), the receiving processor 512 and the controller/processor 540 are used for performing the X measurement(s) in the present disclosure.

In one embodiment, the controller/processor 540 is used for performing the first measurement in the present disclosure.

In one embodiment, the controller/processor 540 is used for performing the Y measurement(s) in the present disclosure.

In one embodiment, the controller/processor 540 is used for determining a target time-frequency unit set out of Q candidate time-frequency unit sets.

Embodiment 6

Figure 6:
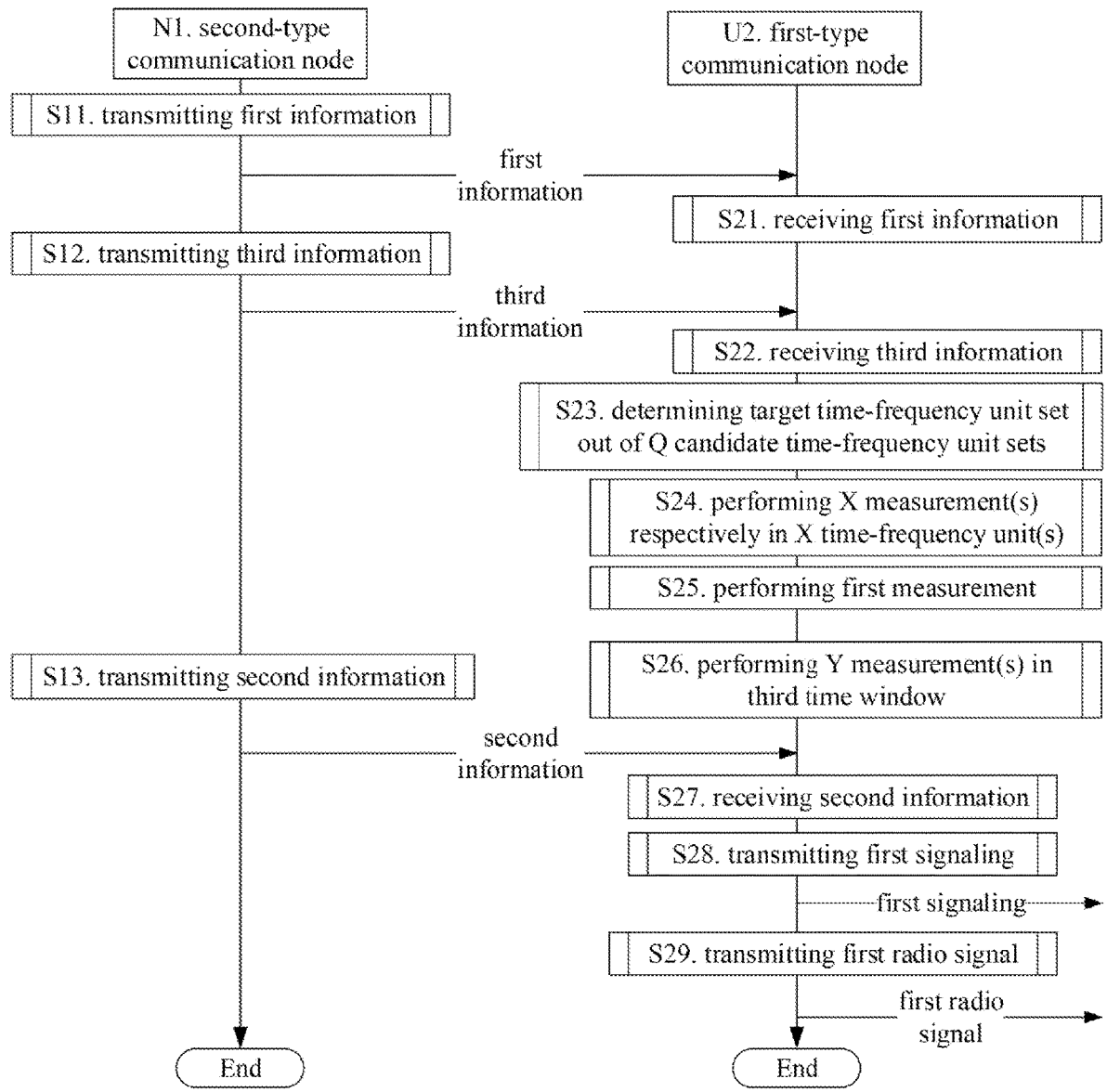
FIG. 6 illustrates a flowchart of radio signal transmission according to one embodiment of the present disclosure.

Embodiment 6 illustrates a flowchart of radio signal transmission according to one embodiment of the present disclosure, as shown in FIG. 6. In FIG. 6, a second-type communication node N1 is a maintenance base station for a serving cell of a first-type communication node U2.

The second-type communication node N1 transmits first information in step S11, transmits second information in step S12, and transmits third information in step S13.

The first-type communication node U2 receives first information in step S21, receives third information in step S22, determines a target time-frequency unit set out of Q candidate time-frequency unit sets in step S23, performs X measurement(s) respectively in X time-frequency unit(s) in step S24, performs a first measurement in step S25, performs Y measurement(s) in a third time window in step S26, receives second information in step S27, transmits a first signaling in step S28, and transmits a first radio signal in step S29.

In Embodiment 6, the X measurement(s) is(are) respectively used for acquiring X first-type measurement value(s), the X being a positive integer; the first measurement is used for acquiring a second-type measurement value; and the X first-type measurement value(s) is(are) used for the first measurement, a second-type measurement value acquired by performing the first measurement is used for determining at least one of an MCS employed by the first radio signal or time-frequency resources occupied by the first radio signal; a number of time-frequency resources occupied by a time-frequency unit of the X time-frequency unit(s) is related to a subcarrier spacing of subcarriers occupied by the first radio signal; each of X1 first-type measurement value(s) out of the X first-type measurement value(s) is greater than a target threshold, the second-type measurement value acquired by performing the first measurement is equal to a ratio of the X1 to the X, the X1 is a non-negative integer not greater than the X, the first information is used for determining the target threshold; the first signaling is used for indicating at least one of the MCS employed by the first radio signal, the time-frequency resources occupied by the first radio signal, or the subcarrier spacing of subcarriers occupied by the first radio signal, the first signaling is transmitted via an air interface; the X time-frequency unit(s) belongs(belong) to a first time window in time domain, the first measurement is performed in a second time window, an end time for the first time window is no later than a start time for the second time window, and an end time for the second time window is no later than a start time for transmission of the first radio signal; the second-type measurement value acquired by performing the first measurement belongs to a target interval, the target interval is one of P candidate intervals, any candidate interval of the P candidate intervals is an interval of positive rational numbers, the P candidate intervals respectively correspond to P candidate MCS sets, the P candidate intervals respectively correspond to P candidate resource quantity sets, the P is a positive integer greater than 1; a candidate MCS set of the P candidate MCS sets that corresponds to the target interval is a first MCS set, and a candidate resource quantity set of the P candidate resource quantity sets that corresponds to the target interval is a first resource quantity set; the second information is used for determining at least one of the MCS employed by the first radio signal and the time-frequency resources occupied by the first radio signal, the MCS employed by the first radio signal is an MCS in the first MCS set, a number of the time-frequency resources occupied by the first radio signal is equal to a resource quantity in the first resource quantity set; the third information is used for determining the subcarrier spacing of subcarriers occupied by the first radio signal; the second-type measurement value acquired by performing the first measurement is used for determining a first upper bound, a sum of the Y third-type measurement value(s) is no greater than the first upper bound, a time domain position of the third time window is related to the time-frequency resources occupied by the first radio signal, the Y third-type measurement value(s) is(are) related to a number of time-frequency resources occupied by radio signal(s) transmitted by a transmitter of the first radio signal in the third time window; a subcarrier spacing of subcarriers occupied by the first radio signal is a target subcarrier spacing, the target subcarrier spacing is a candidate subcarrier spacing of Q candidate subcarrier spacings, the Q is a positive integer greater than 1; the X time-frequency unit(s) belongs(belong) to the target time-frequency unit set, the Q candidate subcarrier spacings respectively correspond to the Q candidate time-frequency unit sets.

In one embodiment, a characteristic measurement value is a first-type measurement value of the X first-type measurement value(s), a measurement of the X measurement(s) used for acquiring the characteristic measurement value is performed in a characteristic time-frequency unit, the characteristic time-frequency unit is a time-frequency unit of the X time-frequency unit(s), the characteristic time-frequency unit comprises X2 multicarrier symbol(s) in time domain, the characteristic measurement value is an average value of receiving power value(s) of the X2 multicarrier symbol(s) within frequency domain resources occupied by the characteristic time-frequency unit.

In one embodiment, the X measurement(s) belongs(belong) to one of Q groups of measurements, the Q groups of measurements respectively correspond to the Q candidate time-frequency unit sets, the Q groups of measurements are used for acquiring Q groups of first-type measurement values, the X first-type measurement value(s) belongs(belong) to one of the Q groups of first-type measurement values, the target subcarrier spacing is used for determining a group of first-type measurement values to which the X first-type measurement value(s) belongs(belong) out of the Q groups of first-type measurement values.

In one embodiment, the first information is a piece of higher layer information.

In one embodiment, the first information is a piece of physical layer information.

In one embodiment, the first information is transmitted via a physical layer signaling.

In one embodiment, the first information is transmitted via a higher layer signaling.

In one embodiment, the first information comprises all or part of a piece of higher layer information.

In one embodiment, the first information comprises all or part of a piece of physical layer information.

In one embodiment, the first information is transmitted through a DL-SCH.

In one embodiment, the first information is transmitted through a Physical Downlink Shared Channel (PDSCH).

In one embodiment, the first information comprises one or more fields in a System Information Block (SIB).

In one embodiment, the first information comprises one or more fields in a piece of Remaining System Information (RMSI).

In one embodiment, the first information comprises all or part of an RRC signaling.

In one embodiment, the first information comprises all or part of a piece of RRC layer information.

In one embodiment, the first information comprises all or part of fields in an Information Element (IE) of a piece of RRC layer information.

In one embodiment, the first information is broadcast.

In one embodiment, the first information is unicast.

In one embodiment, the first information is cell-specific.

In one embodiment, the first information is UE-specific.

In one embodiment, the first information is transmitted through a Physical Downlink Control Channel (PDCCH).

In one embodiment, the first information comprises all or part of fields of a Downlink Control Information (DCI) signaling.

In one embodiment, the phrase that the first information is used for determining the target threshold refers to that the first information is used by the first-type communication node for determining the target threshold.

In one embodiment, the phrase that the first information is used for determining the target threshold refers to that the first information directly indicates the target threshold.

In one embodiment, the phrase that the first information is used for determining the target threshold refers to that the first information indirectly indicates the target threshold.

In one embodiment, the phrase that the first information is used for determining the target threshold refers to that the first information explicitly indicates the target threshold.

In one embodiment, the phrase that the first information is used for determining the target threshold refers to that the first information implicitly indicates the target threshold.

In one embodiment, the first information employs a design as the same as "threshS-RSSI-CBR-r14" in an IE "SL-CommResourcePool" in 3GPP TS36.331(v15.2.0).

In one embodiment, the first information is transmitted via an air interface.

In one embodiment, the first information is transmitted via a Uu interface.

In one embodiment, the first information is transmitted by a radio signal.

In one embodiment, the first information is transmitted from the second-type communication node to the first-type communication node in the present disclosure.

In one embodiment, the first information is transmitted from a higher layer of the first-type communication node to a physical layer of the first-type communication node.

In one embodiment, the first information is conveyed internally within the first-type communication node.

In one embodiment, the phrase that the first information is used for determining the target threshold refers to that the target threshold is equal to a threshold in a first threshold set, the first threshold set comprises a positive integer number of threshold(s), wherein threshold(s) in the first threshold set is(are) pre-defined, the first information is used for determining the target threshold out of the first threshold set.

In one embodiment, the phrase that the first information is used for determining the target threshold refers to that the target threshold is equal to a threshold in a first threshold set, the first threshold set comprises a positive integer number of threshold(s), wherein threshold(s) in the first threshold set is(are) related to a subcarrier spacing of subcarriers occupied by the first radio signal, the first information is used for determining the target threshold out of the first threshold set.

In one embodiment, the target threshold is a non-negative rational number no greater than 1.

In one embodiment, the second information is transmitted via an air interface.

In one embodiment, the second information is transmitted via a Uu interface.

In one embodiment, the second information is transmitted by a radio signal.

In one embodiment, the second information is transmitted from the second-type communication node to the first-type communication node in the present disclosure.

In one embodiment, the second information is transmitted from a higher layer of the first-type communication node to a physical layer of the first-type communication node.

In one embodiment, the second information is conveyed internally within the first-type communication node.

In one embodiment, the second information is a piece of higher layer information.

In one embodiment, the second information is a piece of physical layer information.

In one embodiment, the second information is transmitted via a physical layer signaling.

In one embodiment, the second information is transmitted via a higher layer signaling.

In one embodiment, the second information comprises all or part of a piece of higher layer information.

In one embodiment, the second information comprises all or part of a piece of physical layer information.

In one embodiment, the second information is transmitted through a DL-SCH.

In one embodiment, the second information is transmitted through a PDSCH.

In one embodiment, the second information comprises one or more fields in a SIB.

In one embodiment, the second information comprises one or more fields in a piece of RMSI.

In one embodiment, the second information comprises all or part of an RRC signaling.

In one embodiment, the second information comprises all or part of a piece of RRC layer information.

In one embodiment, the second information comprises all or part of fields in an IE of a piece of RRC layer information.

In one embodiment, the second information is broadcast.

In one embodiment, the second information is unicast.

In one embodiment, the second information is cell-specific.

In one embodiment, the second information is UE-specific.

In one embodiment, the second information is transmitted through a PDCCH.

In one embodiment, the second information comprises all or part of fields of a DCI signaling.

In one embodiment, the phrase that the second information is used for determining at least one of the MCS employed by the first radio signal and the time-frequency resources occupied by the first radio signal refers to: the second information is used by the first-type communication node for determining at least one of the MCS employed by the first radio signal and the time-frequency resources occupied by the first radio signal.

In one embodiment, the phrase that the second information is used for determining at least one of the MCS employed by the first radio signal and the time-frequency resources occupied by the first radio signal refers to: the second information is used for directly indicating at least one of the MCS employed by the first radio signal and the time-frequency resources occupied by the first radio signal.

In one embodiment, the phrase that the second information is used for determining at least one of the MCS employed by the first radio signal and the time-frequency resources occupied by the first radio signal refers to: the second information is used for indirectly indicating at least one of the MCS employed by the first radio signal and the time-frequency resources occupied by the first radio signal.

In one embodiment, the phrase that the second information is used for determining at least one of the MCS employed by the first radio signal and the time-frequency resources occupied by the first radio signal refers to: the second information is used for explicitly indicating at least one of the MCS employed by the first radio signal and the time-frequency resources occupied by the first radio signal.

In one embodiment, the phrase that the second information is used for determining at least one of the MCS employed by the first radio signal and the time-frequency resources occupied by the first radio signal refers to: the second information is used for implicitly indicating at least one of the MCS employed by the first radio signal and the time-frequency resources occupied by the first radio signal.

In one embodiment, the phrase that the second information is used for determining at least one of the MCS employed by the first radio signal and the time-frequency resources occupied by the first radio signal comprises: the second information is used for determining the MCS employed by the first radio signal and the time-frequency resources occupied by the first radio signal.

In one embodiment, the phrase that the second information is used for determining at least one of the MCS employed by the first radio signal and the time-frequency resources occupied by the first radio signal comprises: the second information is used for determining the MCS employed by the first radio signal.

In one embodiment, the phrase that the second information is used for determining at least one of the MCS employed by the first radio signal and the time-frequency resources occupied by the first radio signal comprises: the second information is used for determining the time-frequency resources occupied by the first radio signal In one embodiment, the third information is transmitted via an air interface.

In one embodiment, the third information is transmitted via a Uu interface.

In one embodiment, the third information is transmitted by a radio signal.

In one embodiment, the third information is transmitted from the second-type communication node to the first-type communication node in the present disclosure.

In one embodiment, the third information is transmitted from a higher layer of the first-type communication node to a physical layer of the first-type communication node.

In one embodiment, the third information is conveyed internally within the first-type communication node.

In one embodiment, the third information is a piece of higher layer information.

In one embodiment, the third information is a piece of physical layer information.

In one embodiment, the third information is transmitted via a physical layer signaling.

In one embodiment, the third information is transmitted via a higher layer signaling.

In one embodiment, the third information comprises all or part of a piece of higher layer information.

In one embodiment, the third information comprises all or part of a piece of physical layer information.

In one embodiment, the third information is transmitted through a DL-SCH.

In one embodiment, the third information is transmitted through a PDSCH.

In one embodiment, the third information comprises one or more fields in a SIB.

In one embodiment, the third information comprises one or more fields in a piece of RMSI.

In one embodiment, the third information comprises all or part of an RRC signaling.

In one embodiment, the third information comprises all or part of a piece of RRC layer information.

In one embodiment, the third information comprises all or part of fields in an IE of a piece of RRC layer information.

In one embodiment, the third information is broadcast.

In one embodiment, the third information is unicast.

In one embodiment, the third information is cell-specific.

In one embodiment, the third information is UE-specific.

In one embodiment, the third information is transmitted through a PDCCH.

In one embodiment, the third information comprises all or part of fields of a DCI signaling.

In one embodiment, the phrase that the third information is used for determining the subcarrier spacing of subcarriers occupied by the first radio signal refers to: the third information is used by the first-type communication node for determining the subcarrier spacing of subcarriers occupied by the first radio signal.

In one embodiment, the phrase that the third information is used for determining the subcarrier spacing of subcarriers occupied by the first radio signal refers to: the third information is used for directly determining the subcarrier spacing of subcarriers occupied by the first radio signal.

In one embodiment, the phrase that the third information is used for determining the subcarrier spacing of subcarriers occupied by the first radio signal refers to: the third information is used for indirectly determining the subcarrier spacing of subcarriers occupied by the first radio signal.

In one embodiment, the phrase that the third information is used for determining the subcarrier spacing of subcarriers occupied by the first radio signal refers to: the third information is used for explicitly determining the subcarrier spacing of subcarriers occupied by the first radio signal.

In one embodiment, the phrase that the third information is used for determining the subcarrier spacing of subcarriers occupied by the first radio signal refers to: the third information is used for implicitly determining the subcarrier spacing of subcarriers occupied by the first radio signal.

In one embodiment, the third information and the second information in the present disclosure are different IEs in a same piece of RRC information.

In one embodiment, the third information and the second information in the present disclosure are different fields of a same IE in a same piece of RRC information.

In one embodiment, the third information and the second information in the present disclosure are different IEs of two pieces of RRC information.

In one embodiment, the third information and the second information in the present disclosure are different fields in a same piece of DCI.

In one embodiment, the third information and the second information in the present disclosure are two fields in different pieces of DCI.

Embodiment 7

Figure 7:
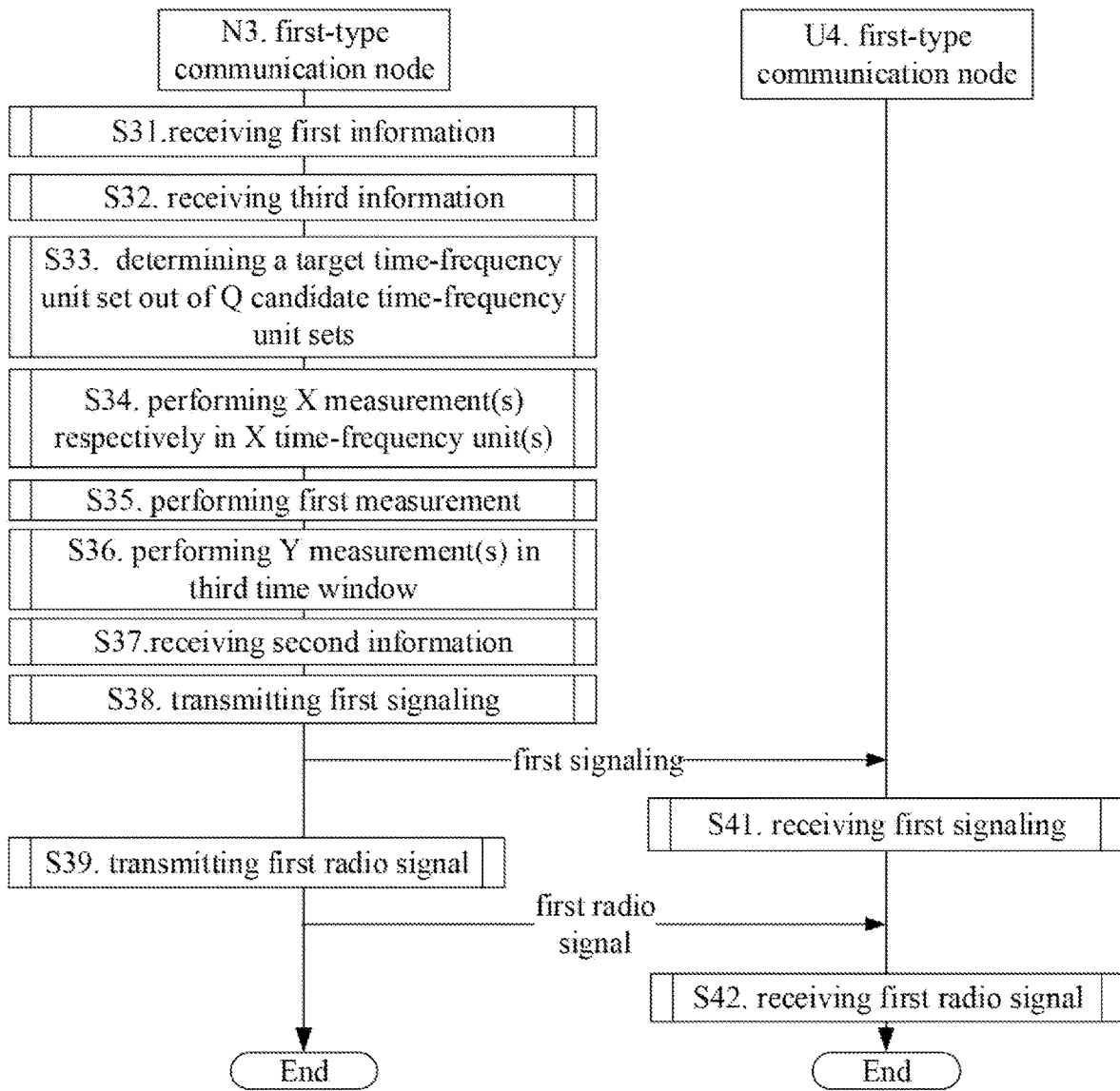
FIG. 7 illustrates a flowchart of radio signal transmission according to another embodiment of the present disclosure.

Embodiment 7 illustrates a flowchart of radio signal transmission according to another embodiment of the present disclosure, as shown in FIG. 7. In FIG. 7, a first-type communication N3 is in communication with another first-type communication node U4, wherein the first-type communication node N3 is out of coverage of a cellular cell.

The first-type communication node N3 receives first information in step S31, receives third information in step S32, determines a target time-frequency unit set out of Q candidate time-frequency unit sets in step S33, performs X measurement(s) respectively in X time-frequency unit(s) in step S34, performs a first measurement in step S35, performs Y measurement(s) in a third time window in step S36, receives second information in step S37, transmits a first signaling in step S38, and transmits a first radio signal in step S39.

The other first-type communication node U4 receives a first signaling in step S41, and receives a first radio signal in step S42.

In Embodiment 7, the X measurement(s) is(are) respectively used for acquiring X first-type measurement value(s), the X is a positive integer; the first measurement is used for acquiring a second-type measurement value; and the X first-type measurement value(s) is(are) used for the first measurement, a second-type measurement value acquired by performing the first measurement is used for determining at least one of an MCS employed by the first radio signal or time-frequency resources occupied by the first radio signal; a number of time-frequency resources occupied by a time-frequency unit of the X time-frequency unit(s) is related to a subcarrier spacing of subcarriers occupied by the first radio signal; each of X1 first-type measurement value(s) out of the X first-type measurement value(s) is greater than a target threshold, the second-type measurement value acquired by performing the first measurement is equal to a ratio of the X1 to the X, the X1 is a non-negative integer not greater than the X, the first information is used for determining the target threshold; the first signaling is used for indicating at least one of the MCS employed by the first radio signal, the time-frequency resources occupied by the first radio signal, or the subcarrier spacing of subcarriers occupied by the first radio signal, the first signaling is transmitted via an air interface; the X time-frequency unit(s) belongs(belong) to a first time window in time domain, the first measurement is performed in a second time window, an end time for the first time window is no later than a start time for the second time window, and an end time for the second time window is no later than a start time for transmission of the first radio signal; the second-type measurement value acquired by performing the first measurement belongs to a target interval, the target interval is one of P candidate intervals, any candidate interval of the P candidate intervals is an interval of positive rational numbers, the P candidate intervals respectively correspond to P candidate MCS sets, the P candidate intervals respectively correspond to P candidate resource quantity sets, the P is a positive integer greater than 1; a candidate MCS set of the P candidate MCS sets that corresponds to the target interval is a first MCS set, and a candidate resource quantity set of the P candidate resource quantity sets that corresponds to the target interval is a first resource quantity set; the second information is used for determining at least one of the MCS employed by the first radio signal and the time-frequency resources occupied by the first radio signal, the MCS employed by the first radio signal is an MCS in the first MCS set, a number of the time-frequency resources occupied by the first radio signal is equal to a resource quantity in the first resource quantity set; the third information is used for determining the subcarrier spacing of subcarriers occupied by the first radio signal; the second-type measurement value acquired by performing the first measurement is used for determining a first upper bound, a sum of the Y third-type measurement value(s) is no greater than the first upper bound, a time domain position of the third time window is related to the time-frequency resources occupied by the first radio signal, the Y third-type measurement value(s) is(are) related to a number of time-frequency resources occupied by radio signal(s) transmitted by a transmitter of the first radio signal in the third time window; a subcarrier spacing of subcarriers occupied by the first radio signal is a target subcarrier spacing, the target subcarrier spacing is a candidate subcarrier spacing of Q candidate subcarrier spacings, the Q is a positive integer greater than 1; the X time-frequency unit(s) belongs(belong) to the target time-frequency unit set, the Q candidate subcarrier spacings respectively correspond to the Q candidate time-frequency unit sets.

In one embodiment, a characteristic measurement value is a first-type measurement value of the X first-type measurement value(s), a measurement of the X measurement(s) used for acquiring the characteristic measurement value is performed in a characteristic time-frequency unit, the characteristic time-frequency unit is a time-frequency unit of the X time-frequency unit(s), the characteristic time-frequency unit comprises X2 multicarrier symbol(s) in time domain, the characteristic measurement value is an average value of receiving power value(s) of the X2 multicarrier symbol(s) within frequency domain resources occupied by the characteristic time-frequency unit.

In one embodiment, the X measurement(s) belongs(belong) to one of Q groups of measurements, the Q groups of measurements respectively correspond to the Q candidate time-frequency unit sets, the Q groups of measurements are used for acquiring Q groups of first-type measurement values, the X first-type measurement value(s) belongs(belong) to one of the Q groups of first-type measurement values, the target subcarrier spacing is used for determining a group of first-type measurement values to which the X first-type measurement value(s) belongs(belong) out of the Q groups of first-type measurement values.

In one embodiment, the air interface is wireless.

In one embodiment, the air interface comprises a wireless channel.

In one embodiment, the air interface comprises sidelink.

In one embodiment, the air interface is a PC5 interface.

In one embodiment, the first signaling comprises physical layer information.

In one embodiment, the first signaling is a physical layer signaling transmission.

In one embodiment, the first signaling comprises all or part of a piece of physical layer information.

In one embodiment, the first signaling is broadcast.

In one embodiment, the first signaling is groupcast.

In one embodiment, the first signaling is unicast.

In one embodiment, the first signaling is cell-specific.

In one embodiment, the first signaling is UE-specific.

In one embodiment, the first signaling is transmitted through a Physical Sidelink Control Channel (PSCCH).

In one embodiment, the first signaling comprises all or part of fields of a SCI signaling.

In one embodiment, the first signaling comprises a Scheduling Assignment (SA) of the first radio signal.

In one embodiment, the phrase that "the first signaling is used for indicating at least one of the MCS employed by the first radio signal, the time-frequency resources occupied by the first radio signal, or the subcarrier spacing of subcarriers occupied by the first radio signal" refers to: the first signaling is used for directly indicating at least one of the MCS employed by the first radio signal, the time-frequency resources occupied by the first radio signal, or the subcarrier spacing of subcarriers occupied by the first radio signal.

In one embodiment, the phrase that "the first signaling is used for indicating at least one of the MCS employed by the first radio signal, the time-frequency resources occupied by the first radio signal, or the subcarrier spacing of subcarriers occupied by the first radio signal" refers to: the first signaling is used for indirectly indicating at least one of the MCS employed by the first radio signal, the time-frequency resources occupied by the first radio signal, or the subcarrier spacing of subcarriers occupied by the first radio signal.

In one embodiment, the phrase that "the first signaling is used for indicating at least one of the MCS employed by the first radio signal, the time-frequency resources occupied by the first radio signal, or the subcarrier spacing of subcarriers occupied by the first radio signal" refers to: the first signaling is used for explicitly indicating at least one of the MCS employed by the first radio signal, the time-frequency resources occupied by the first radio signal, or the subcarrier spacing of subcarriers occupied by the first radio signal.

In one embodiment, the phrase that "the first signaling is used for indicating at least one of the MCS employed by the first radio signal, the time-frequency resources occupied by the first radio signal, or the subcarrier spacing of subcarriers occupied by the first radio signal" refers to: the first signaling is used for implicitly indicating at least one of the MCS employed by the first radio signal, the time-frequency resources occupied by the first radio signal, or the subcarrier spacing of subcarriers occupied by the first radio signal.

Embodiment 8

Figure 8:
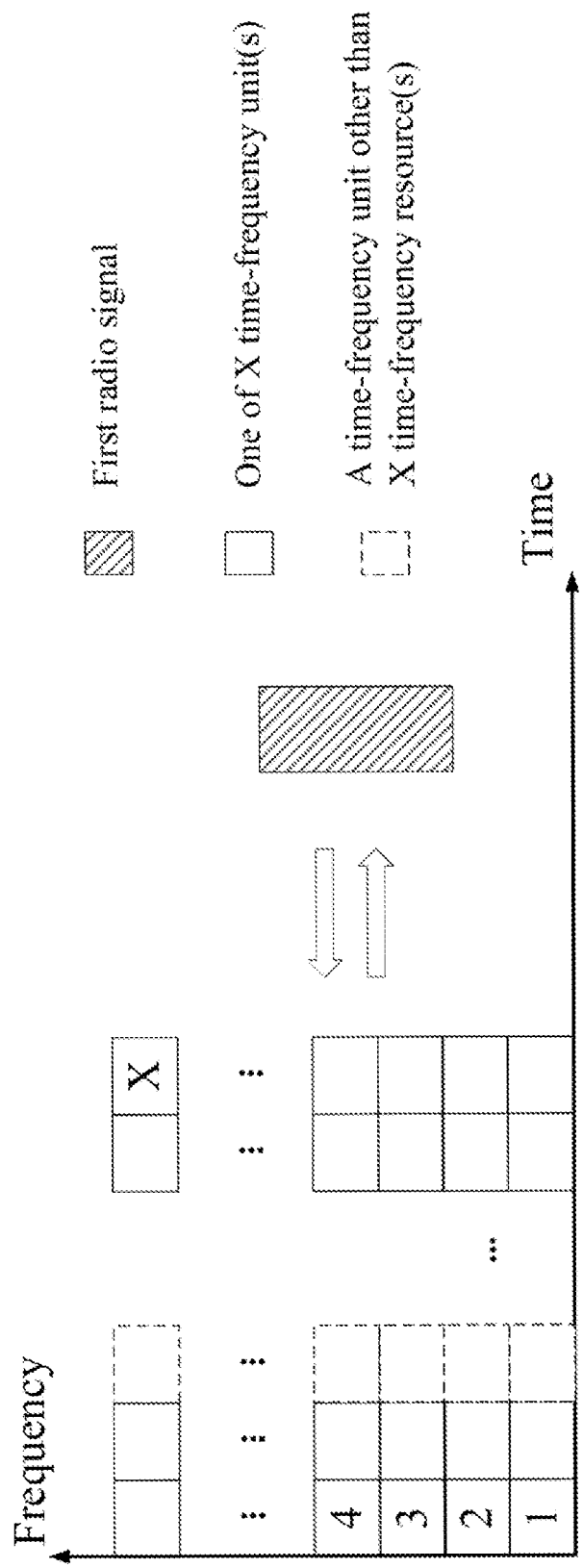
FIG. 8 illustrates a schematic diagram of relation(s) between X time-frequency unit(s) and a first radio signal according to one embodiment of the present disclosure.

Embodiment 8 illustrates a schematic diagram of relation(s) between X time-frequency unit(s) and a first radio signal according to one embodiment of the present disclosure, as shown in FIG. 8. In FIG. 8, the horizontal axis represents time, while the vertical axis represents frequency, each non-filling rectangle framed with solid lines represents one of X time-frequency unit(s), and each non-filling rectangle framed with dotted lines represents one time-frequency unit other than the X time-frequency unit(s), and a rectangle filled with slashes represents a first radio signal.

In Embodiment 8, the first-type communication node in the present disclosure performs X measurement(s) respectively in X time-frequency unit(s), the X measurement(s) being respectively used for acquiring X first-type measurement value(s), the X being a positive integer; and then performs a first measurement, the first measurement being used for acquiring a second-type measurement value; and transmits a first radio signal; herein, the X first-type measurement value(s) is(are) used for the first measurement, a second-type measurement value acquired by performing the first measurement is used for determining at least one of an MCS employed by the first radio signal or time-frequency resources occupied by the first radio signal; a number of time-frequency resources occupied by a time-frequency unit of the X time-frequency unit(s) is related to a subcarrier spacing of subcarriers occupied by the first radio signal.

Embodiment 9

Figure 9:
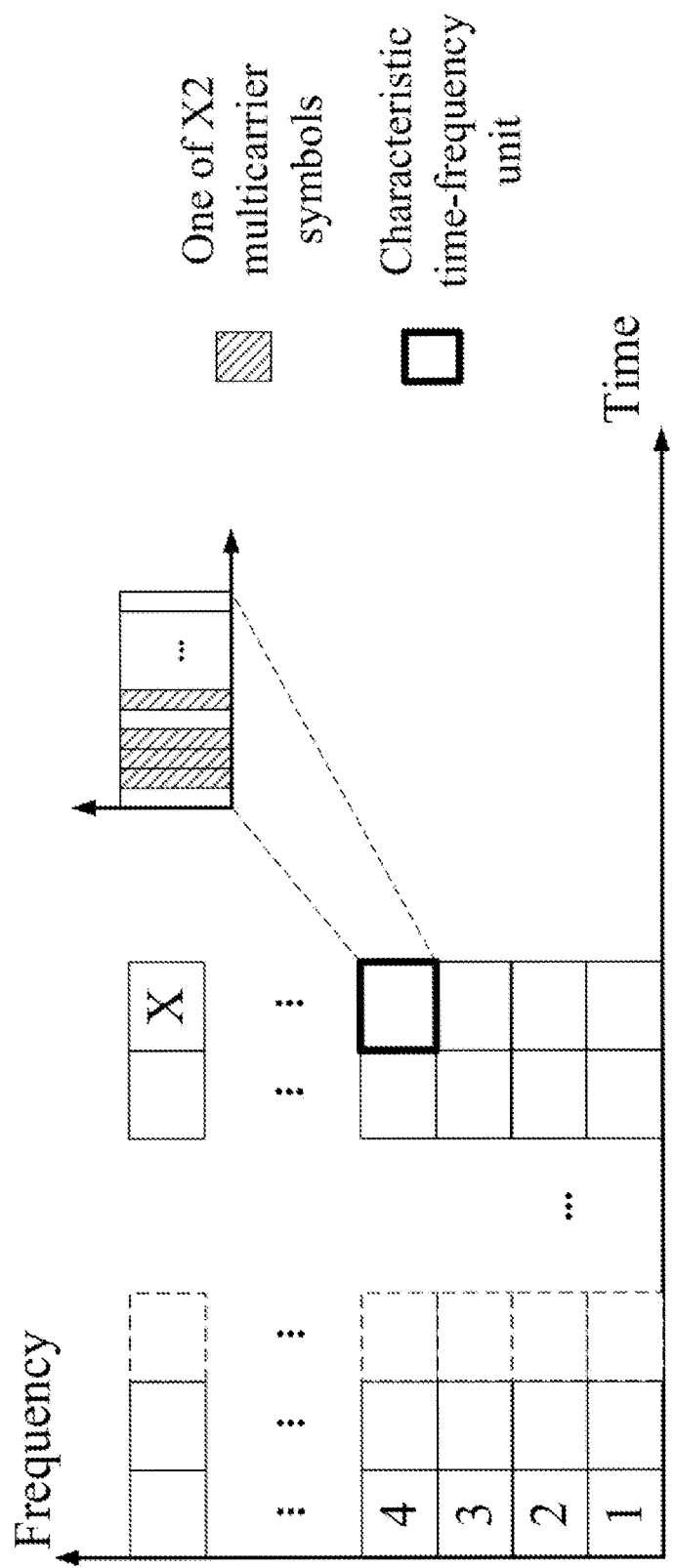
FIG. 9 illustrates a schematic diagram of relation(s) between a characteristic time-frequency unit and X2 multi-carrier symbol(s) according to one embodiment of the present disclosure.

Embodiment 9 illustrates a schematic diagram of relation(s) between a characteristic time-frequency unit and X2 multicarrier symbol(s) according to one embodiment of the present disclosure, as shown in FIG. 9. In FIG. 9, the horizontal axis represents time while the vertical axis represents frequency, each rectangle filled with slashes represents one of X2 multicarrier symbol(s) and a rectangle framed with solid lines represents a characteristic time-frequency unit.

In Embodiment 9, a characteristic measurement value is a first-type measurement value of the X first-type measurement value(s), a measurement of the X measurement(s) used for acquiring the characteristic measurement value is performed in a characteristic time-frequency unit, the characteristic time-frequency unit is a time-frequency unit of the X time-frequency unit(s), the characteristic time-frequency unit comprises X2 multicarrier symbol(s) in time domain, the characteristic measurement value is an average value of receiving power value(s) of the X2 multicarrier symbol(s) within frequency domain resources occupied by the characteristic time-frequency unit.

In one embodiment, the characteristic measurement value can be any of the X first-type measurement value(s).

In one embodiment, each of the X time-frequency unit(s) comprises a positive integer number of multicarrier symbol(s) in time domain.

In one embodiment, each of the X time-frequency unit(s) comprises X2 multicarrier symbol(s) which can be used for one of the X measurement(s) in time domain.

In one embodiment, the characteristic time-frequency unit only comprises the X2 multicarrier symbol(s) in time domain.

In one embodiment, the characteristic time-frequency unit only comprises multicarrier(s) other than the X2 multicarrier symbol(s) in time domain.

In one embodiment, time domain position(s) of the X2 multicarrier symbol(s) in the characteristic time-frequency unit is(are) pre-defined.

In one embodiment, time domain position(s) of the X2 multicarrier symbol(s) in the characteristic time-frequency unit is(are) fixed.

In one embodiment, time domain position(s) of the X2 multicarrier symbol(s) in the characteristic time-frequency unit is(are) configurable.

In one embodiment, time domain position(s) of the X2 multicarrier symbol(s) in the characteristic time-frequency unit is(are) related to the subcarrier spacing of subcarriers occupied by the first radio signal.

In one embodiment, any of the X measurement(s) is performed within frequency domain resources occupied by one of the X time-frequency unit(s) wherein the measurement is performed.

In one embodiment, the phrase that "the characteristic measurement value is an average value of receiving power value(s) of the X2 multicarrier symbol(s) within frequency domain resources occupied by the characteristic time-frequency unit" in a frequency domain resource occupied by the characteristic time-frequency unit, measurement(s) of the X measurement(s) targeting the X2 multicarrier symbol(s) is(are) respectively performed to acquire X2 power value(s), the characteristic measurement value is equal to a sum of the X2 power value(s) divided by X2.

Embodiment 10

Figure 10:
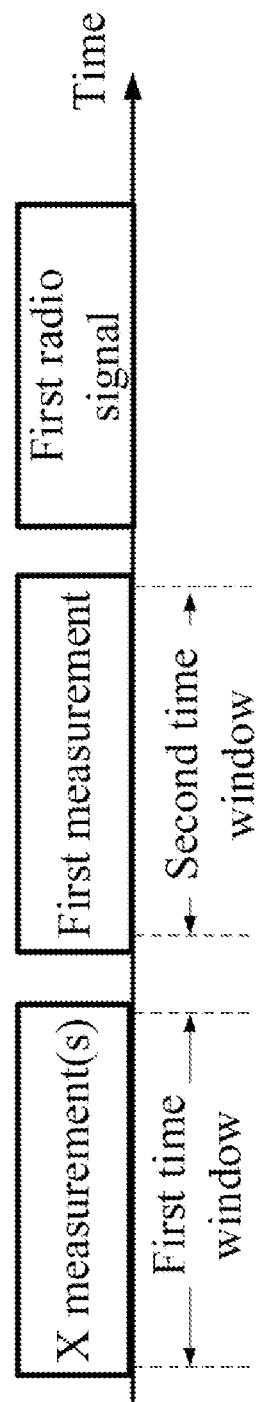
FIG. 10 illustrates a schematic diagram of a relation between a first time window and a second time window according to one embodiment of the present disclosure.

Embodiment 10 illustrates a schematic diagram of a relation between a first time window and a second time window according to one embodiment of the present disclosure, as shown in FIG. 10. In FIG. 10, the horizontal axis represents time. In Embodiment 10, the X time-frequency unit(s) in the present disclosure belongs(belong) to a first time window in time domain, the first measurement in the present disclosure is performed in a second time window, an end time for the first time window is no later than a start time for the second time window, and an end time for the second time window is no later than a start time for transmission of the first radio signal.

In one embodiment, the first time window only comprises time domain resources occupied by the X time-frequency unit(s).

In one embodiment, the first time window also comprises time domain resources other than those occupied by the X time-frequency unit(s).

In one embodiment, the first time window is used for determining the X time-frequency unit(s).

In one embodiment, the X time-frequency unit(s) is(are) all time-frequency unit(s) that can be used for S-RSSI measurement within the first time window in a carrier to which the frequency domain resources occupied by the first radio signal belong.

In one embodiment, the time length of the first time window is fixed.

In one embodiment, the time length of the first time window is 100 ms.

In one embodiment, the time length of the first time window is pre-configured.

In one embodiment, the time length of the first time window is pre-defined.

In one embodiment, the time length of the first time window can be configured.

In one embodiment, the time length of the first time window is related to a subcarrier spacing of subcarriers occupied by the first radio signal.

In one embodiment, the end time for the first time window is the start time for the second time window.

In one embodiment, the end time for the first time window is earlier than the start time for the second time window.

In one embodiment, the time length of the second time window is fixed.

In one embodiment, the time length of the second time window is pre-configured.

In one embodiment, the time length of the second time window is 1 ms.

In one embodiment, the time length of the second time window is pre-defined.

In one embodiment, the time length of the second time window can be configured.

In one embodiment, the time length of the second time window is related to a subcarrier spacing of subcarriers occupied by the first radio signal.

In one embodiment, the end time for the second time window is the start time for transmission of the first radio signal.

In one embodiment, the end time for the second time window is earlier than the start time for transmission of the first radio signal.

In one embodiment, the first measurement occupies all the time within the second time window.

In one embodiment, the first measurement occupies part of the time within the second time window.

Embodiment 11

Embodiment 11 illustrates a schematic diagram of relations between P candidate intervals, P candidate MCS sets and P candidate resource quantity sets according to one embodiment of the present disclosure, as shown in FIG. 11. In FIG. 11, the second column on the left represents P candidate intervals, the third column on the left represents P candidate MCS sets, wherein each quantity represents an MCS index value, the fourth column on the left represents P candidate resource quantity set, the letters and numbers in bold represent the target interval, the first MCS set and the first candidate resource quantity set, respectively.

In Embodiment 11, the second-type measurement value acquired by performing the first measurement belongs to a target interval, the target interval is one of P candidate intervals, any candidate interval of the P candidate intervals is an interval of positive rational numbers, the P candidate intervals respectively correspond to P candidate MCS sets, the P candidate intervals respectively correspond to P candidate resource quantity sets, the P is a positive integer greater than 1; a candidate MCS set of the P candidate MCS sets that corresponds to the target interval is a first MCS set, and a candidate resource quantity set of the P candidate resource quantity sets that corresponds to the target interval is a first resource quantity set; the second information is used for determining at least one of the MCS employed by the first radio signal and the time-frequency resources occupied by the first radio signal, the MCS employed by the first radio signal is an MCS in the first MCS set, a number of the time-frequency resources occupied by the first radio signal is equal to a resource quantity in the first resource quantity set.

In one embodiment, any two of the P candidate intervals have a same interval length.

In one embodiment, there are two candidate intervals in the P candidate intervals that have different interval lengths.

In one embodiment, any two of the P candidate intervals are orthogonal.

In one embodiment, any two of the P candidate intervals are non-orthogonal.

In one embodiment, any two of the P candidate intervals are non-overlapping.

In one embodiment, there are two candidate intervals in the P candidate intervals that are partially intersected.

In one embodiment, there are two candidate intervals in the P candidate intervals that are partially overlapping.

In one embodiment, any of the P candidate MCS sets comprises a positive integer number of MCSs.

In one embodiment, any two of the P candidate MCS sets comprise different MCSs.

In one embodiment, there are two candidate MCS sets in the P candidate MCS sets that comprise a same MCS.

In one embodiment, any two of the P candidate MCS sets comprise different numbers of MCSs.

In one embodiment, the P candidate MCS sets are pre-defined.

In one embodiment, the P candidate MCS sets are pre-configured.

In one embodiment, the P candidate MCS sets can be configured.

In one embodiment, the one-to-one correspondence relations between the P candidate intervals and the P candidate MCS sets are pre-defined.

In one embodiment, the one-to-one correspondence relations between the P candidate intervals and the P candidate MCS sets are fixed.

In one embodiment, the one-to-one correspondence relations between the P candidate intervals and the P candidate MCS sets are configurable.

In one embodiment, the P candidate resource quantity sets are pre-defined.

In one embodiment, the P candidate resource quantity sets are pre-configured.

In one embodiment, the P candidate resource quantity sets can be configured.

In one embodiment, any two resource quantities respectively comprised by any two of the P candidate resource quantity sets are unequal.

In one embodiment, there are two candidate resource quantity sets in the P candidate resource quantity sets that respectively comprise equal resource quantity(s).

In one embodiment, any two of the P candidate resource quantity sets respectively comprise equal numbers of resource quantities.

In one embodiment, there are two candidate resource quantity sets in the P candidate resource quantity sets that comprise unequal numbers of resource quantities.

In one embodiment, the one-to-one correspondence relations between the P candidate intervals and the P candidate resource quantity sets are pre-defined.

In one embodiment, the one-to-one correspondence relations between the P candidate intervals and the P candidate resource quantity sets are pre-configured.

In one embodiment, the one-to-one correspondence relations between the P candidate intervals and the P candidate resource quantity sets are fixed.

In one embodiment, the one-to-one correspondence relations between the P candidate intervals and the P candidate resource quantity sets are configurable.

Embodiment 12

Figure 12:
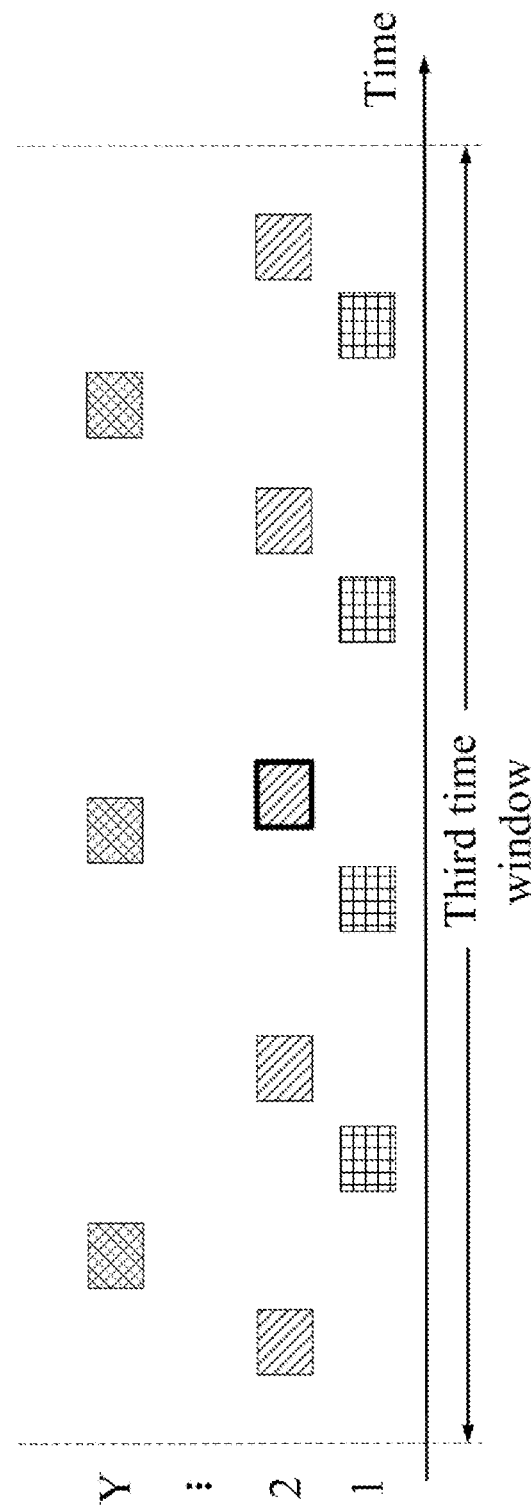
FIG. 12 illustrates a schematic diagram of Y measurement(s) according to one embodiment of the present disclosure.

Embodiment 12 illustrates a schematic diagram of Y measurement(s) according to one embodiment of the present disclosure, as shown in FIG. 12. In FIG. 12, the horizontal axis represents time, each rectangle represents a time-frequency resource occupied by radio signal(s) transmitted by a transmitter of the first radio signal in the third time window, wherein the rectangle framed with thick lines represents the time-frequency resources occupied by the first radio signal, and other rectangles with varying fillings respectively represent the time-frequency resources being used for each of the Y measurements.

In Embodiment 12, the first-type communication node in the present disclosure performs Y measurements in a third time window, the Y measurements are used for acquiring Y third-type measurement values respectively, the Y is a positive integer; a second-type measurement value acquired by performing the first measurement in the present disclosure is used for determining a first upper bound, a sum of the Y third-type measurement values is no greater than the first upper bound, a time domain position of the third time window is related to the time-frequency resources occupied by the first radio signal, the Y third-type measurement values are related to a number of time-frequency resources occupied by radio signal(s) transmitted by a transmitter of the first radio signal in the third time window.

In one embodiment, any of the Y measurements is a measurement on Channel occupancy Ratio (CR).

In one embodiment, any of the Y measurements is a measurement on Channel occupancy Quantity (CQ).

In one embodiment, any of the Y measurements and the first measurement in the present disclosure are two types of measurements.

In one embodiment, any of the Y measurements and any of the X measurement(s) in the present disclosure are two types of measurements.

In one embodiment, any of the Y measurements is used for determining the channel occupancy status of a channel(s) measured.

In one embodiment, any of the Y measurements is used for determining the channel occupancy status within a frequency range measured.

In one embodiment, the Y measurements respectively correspond to Y ProSe Per-Packet Priorities (PPPP).

In one embodiment, any of the Y measurements is a measurement on CR under one PPPP.

In one embodiment, any of the Y third-type measurement values is a value of CR.

In one embodiment, any of the Y third-type measurement values is a value of CQ.

In one embodiment, the Y third-type measurement values are CR values respectively corresponding to Y PPPPs.

In one embodiment, the Y third-type measurement values respectively correspond to Y PPPPs, a PPPP of a packet carried by the first radio signal is a minimum PPPP of the Y PPPPs.

In one embodiment, the Y third-type measurement values respectively correspond to Y priorities, a priority of a packet carried by the first radio signal is a lowest priority of the Y priorities.

In one embodiment, the Y third-type measurement values respectively correspond to Y priority indices, a priority index of a priority of a packet carried by the first radio signal is equal to a minimum index value of the Y priority indices.

In one embodiment, the first signaling in the present disclosure is also used for determining the first upper bound.

In one embodiment, the phrase that "the second-type measurement value acquired by performing the first measurement is used for determining a first upper bound" refers to: the second-type measurement value acquired by performing the first measurement is used by the first-type communication node for determining a first upper bound In one embodiment, the phrase that "the second-type measurement value acquired by performing the first measurement is used for determining a first upper bound" refers to: the second-type measurement value acquired by performing the first measurement determines a first upper bound based on a given mapping relation.

In one embodiment, the phrase that "the second-type measurement value acquired by performing the first measurement is used for determining a first upper bound" refers to: the second-type measurement value acquired by performing the first measurement determines a first upper bound based on a given function relation.

In one embodiment, the phrase that "the second-type measurement value acquired by performing the first measurement is used for determining a first upper bound" refers to: the second-type measurement value acquired by performing the first measurement determines a first upper bound based on a correspondence relation, wherein the correspondence relation is pre-defined.

In one embodiment, the phrase that "the second-type measurement value acquired by performing the first measurement is used for determining a first upper bound" refers to: the second-type measurement value acquired by performing the first measurement determines a first upper bound based on a correspondence relation, wherein the correspondence relation is configurable.

In one embodiment, the phrase that "the second-type measurement value acquired by performing the first measurement is used for determining a first upper bound" refers to:

In one embodiment, the phrase that "the second-type measurement value acquired by performing the first measurement is used for determining a first upper bound" refers to:

In one embodiment, the time length of the third time window is pre-configured.

In one embodiment, the time length of the third time window is fixed.

In one embodiment, the time length of the third time window is equal to 1 s.

In one embodiment, the time length of the third time window is pre-defined.

In one embodiment, the time length of the third time window is configurable.

In one embodiment, the time length of the third time window is determined by the first-type communication node itself.

In one embodiment, the phrase that "a time domain position of the third time window is related to the time-frequency resources occupied by the first radio signal" refers to: an end time for the third time window is no later than a start time for transmission of the first radio signal.

In one embodiment, the phrase that "a time domain position of the third time window is related to the time-frequency resources occupied by the first radio signal" refers to: given that an end time for the third time window is no later than a start time for transmission of the first radio signal, the time domain position of the third time window is determined by the first-type communication node itself.

In one embodiment, the phrase that "a time domain position of the third time window is related to the time-frequency resources occupied by the first radio signal" refers to: the time-frequency resources occupied by the first radio signal are used for determining the time domain position of the third time window.

In one embodiment, the phrase that "a time domain position of the third time window is related to the time-frequency resources occupied by the first radio signal" refers to: the third time window comprises both time domain resources occupied by the first radio signal and reserved time domain resources configured in the grant of the first radio signal.

In one embodiment, the phrase that "a time domain position of the third time window is related to the time-frequency resources occupied by the first radio signal" refers to: the third time window comprises both time domain resources occupied by the first radio signal and part of reserved time domain resources configured in the grant of the first radio signal.

In one embodiment, the phrase that "a time domain position of the third time window is related to the time-frequency resources occupied by the first radio signal" refers to: the third time window does not comprise any of reserved time domain resources configured in the grant of the first radio signal.

In one embodiment, the phrase that "a time domain position of the third time window is related to the time-frequency resources occupied by the first radio signal" refers to: the third time window is divided into a first time sub-window and a second time sub-window by time sequence, the time length of the first time sub-window is self-determined by the first-type communication node, and the second time sub-window comprises both time domain resources occupied by the first radio signal and reserved time domain resources configured in the grant of the first radio signal.

In one embodiment, the phrase that "a time domain position of the third time window is related to the time-frequency resources occupied by the first radio signal" refers to: given that an end time for the third time window is no later than a latest end time for reserved time domain resources configured in the grant of the first radio signal, the time domain position of the third time window is self-determined by the first-type communication node.

In one embodiment, the phrase that "a time domain position of the third time window is related to the time-frequency resources occupied by the first radio signal" refers to: the third time window is divided into a first time sub-window and a second time sub-window by time sequence, the time length of the first time sub-window, when not less than a length threshold, is self-determined by the first-type communication node, an end time for the second time sub-window is no later than a latest end time for reserved time domain resources configured in the grant of the first radio signal.

In one embodiment, the phrase that "the Y third-type measurement values are related to a number of time-frequency resources occupied by radio signal(s) transmitted by a transmitter of the first radio signal in the third time window" refers to: the Y third-type measurement values respectively correspond to Y priorities, the Y third-type measurement values are respectively numbers of time-frequency resources occupied by radio signals with corresponding priorities transmitted by the transmitter of the first radio signal in the third time window.

In one embodiment, the phrase that "the Y third-type measurement values are related to a number of time-frequency resources occupied by radio signal(s) transmitted by a transmitter of the first radio signal in the third time window" refers to: the Y third-type measurement values respectively correspond to Y priorities, any of the Y third-type measurement values is a ratio of a number of time-frequency resources occupied by a radio signal with a corresponding priority transmitted by the transmitter of the first radio signal in the third time window to a total number of time-frequency resources with the corresponding priority within the third time window.

Embodiment 13

Figure 13:
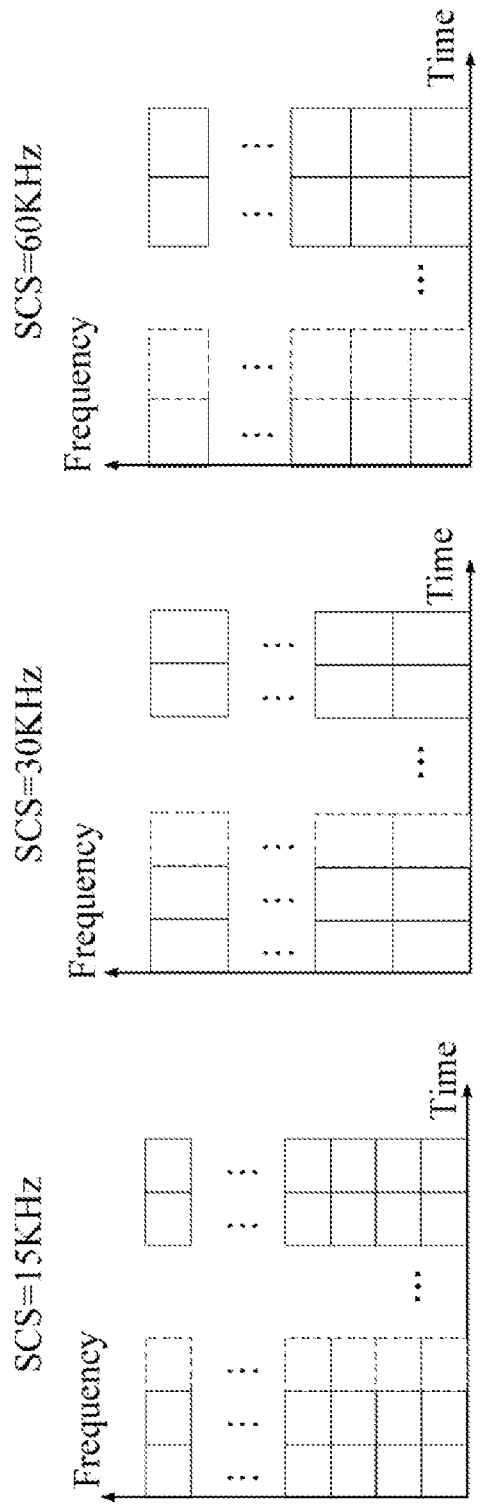
FIG. 13 illustrates a schematic diagram of relations between Q candidate SCSs and Q candidate time-frequency unit sets according to one embodiment of the present disclosure.

Embodiment 13 illustrates a schematic diagram of relations between Q candidate SCSs and Q candidate time-frequency unit sets according to one embodiment of the present disclosure, as shown in FIG. 13. In FIG. 13, the horizontal axis represents time, and the vertical axis represents frequency, Q candidate subcarrier spacings are 15 KHz, 30 KHz and 60 KHz, respectively. Each non-filling rectangle framed with solid lines represents a time-frequency unit in a candidate time-frequency unit set within a corresponding subcarrier spacing, while each non-filling rectangle framed with dotted lines represents a time-frequency unit other than Q candidate time-frequency unit sets.

In Embodiment 13, the first-type communication node in the present disclosure determines a target time-frequency unit set out of Q candidate time-frequency unit sets; herein, a subcarrier spacing of subcarriers occupied by the first radio signal is a target subcarrier spacing, the target subcarrier spacing is a candidate subcarrier spacing of Q candidate subcarrier spacings, the Q is a positive integer greater than 1; the X time-frequency unit(s) belongs(belong) to the target time-frequency unit set, the Q candidate subcarrier spacings respectively correspond to the Q candidate time-frequency unit sets.

In one embodiment, the Q candidate time-frequency unit sets are pre-configured.

In one embodiment, the Q candidate time-frequency unit sets are pre-defined.

In one embodiment, the Q candidate time-frequency unit sets are fixed.

In one embodiment, the Q candidate time-frequency unit sets can be configured.

In one embodiment, correspondence relations between the Q candidate subcarrier spacings and the Q candidate time-frequency unit sets are pre-configured.

In one embodiment, correspondence relations between the Q candidate subcarrier spacings and the Q candidate time-frequency unit sets are fixed.

In one embodiment, correspondence relations between the Q candidate subcarrier spacings and the Q candidate time-frequency unit sets are pre-defined.

In one embodiment, correspondence relations between the Q candidate subcarrier spacings and the Q candidate time-frequency unit sets can be configured.

In one embodiment, determining the target time-frequency unit set out of the Q candidate time-frequency unit sets comprises: a sequential order of the target subcarrier spacing in the Q candidate subcarrier spacings is used for determining the target time-frequency unit set out of the Q candidate time-frequency unit set.

In one embodiment, determining the target time-frequency unit set out of the Q candidate time-frequency unit sets comprises: an index of the target subcarrier spacing in the Q candidate subcarrier spacings is used for determining the target time-frequency unit set out of the Q candidate time-frequency unit set.

In one embodiment, determining the target time-frequency unit set out of the Q candidate time-frequency unit sets comprises: an order of magnitude of the target subcarrier spacing in the Q candidate subcarrier spacings is used for determining the target time-frequency unit set out of the Q candidate time-frequency unit set.

In one embodiment, determining the target time-frequency unit set out of the Q candidate time-frequency unit sets comprises: a candidate time-frequency unit set of the Q candidate time-frequency unit sets that corresponds to the target subcarrier spacing is the target time-frequency unit set.

In one embodiment, any two of the Q candidate subcarrier spacings are unequal.

In one embodiment, there are two candidate subcarrier spacings in the Q candidate subcarrier spacings that are equal.

In one embodiment, there are at least two candidate subcarrier spacings in the Q candidate subcarrier spacings that are unequal.

In one embodiment, the Q candidate subcarrier spacings are related to a frequency domain position of frequency domain resources occupied by the first radio signal.

In one embodiment, the Q candidate subcarrier spacings are related to a carrier frequency range of a carrier to which frequency domain resources occupied by the first radio signal belong.

In one embodiment, if a carrier frequency of a carrier to which frequency domain resources occupied by the first radio signal belong is not greater than 6 GHz (Frequency Range 1), the Q candidate subcarrier spacings include 15 kHz, 30 kHz and 60 kHz, the Q is not less than 3; if a carrier frequency of a carrier to which frequency domain resources occupied by the first radio signal belong is greater than 6 GHz (Frequency Range 2), the Q candidate subcarrier spacings include 120 kHz and 240 kHz, the Q is not less than 2.

In one embodiment, if a carrier frequency of a carrier to which frequency domain resources occupied by the first radio signal belong is not greater than 6 GHz (Frequency Range 1), the Q candidate subcarrier spacings include 15 kHz, 30 kHz and 60 kHz, the Q is not less than 3; if a carrier frequency of a carrier to which frequency domain resources occupied by the first radio signal belong is greater than 6 GHz (Frequency Range 2), the Q candidate subcarrier spacings include 60 kHz, 120 kHz, 240 kHz and 480 kHz, the Q is not less than 4.

In one embodiment, the target time-frequency unit set only comprises the X time-frequency unit(s).

In one embodiment, the target time-frequency unit set also comprises time-frequency resource(s) other than the X time-frequency units(s).

In one embodiment, the X time-frequency unit(s) is(are) time-frequency unit(s) in the target time-frequency unit set other than a time-frequency unit used for transmission of the first-type communication node.

In one embodiment, the X time-frequency unit(s) is(are) all time-frequency unit(s) in the target time-frequency unit set that can be used for acquiring first-type measurement value(s).

Embodiment 14

Embodiment 14 illustrates a schematic diagram of a relation between a target SCS and a group of first-type measurement values to which X first-type measurement value(s) belongs(belong) according to one embodiment of the present disclosure, as shown in FIG. 14. In FIG. 14, the first column on the left represents a frequency range to which frequency domain resources occupied by a signal transmitted by the first-type communication node belong, the second column on the left represents a subcarrier spacing of subcarriers occupied by a signal transmitted by the first-type communication node, and the column on the right represents Q groups of first-type measurement values (Q=5), letters and numbers in bold respectively represent the target subcarrier spacing and a group of first-type measurement values that the X first-type measurement value(s) belongs (belong).

In Embodiment 14, the X measurement(s) in the present disclosure belongs(belong) to one of Q groups of measurements, the Q groups of measurements respectively correspond to the Q candidate time-frequency unit sets in the present disclosure, the Q groups of measurements are used for acquiring Q groups of first-type measurement values, the X first-type measurement value(s) in the present disclosure belongs(belong) to one of the Q groups of first-type measurement values, the target subcarrier spacing in the present disclosure is used for determining a group of first-type measurement values that the X first-type measurement value(s) belongs(belong) to out of the Q groups of first-type measurement values.

In one embodiment, the first-type communication node performs all measurements in each of the Q groups of measurements.

In one embodiment, in the first-type communication node there exists each first-type measurement value of the Q groups of first-type measurement values.

In one embodiment, the first-type communication node performs all measurements in each of the Q groups of measurements before transmitting the first radio signal.

In one embodiment, the first-type communication node is required to perform all measurements in each of the Q groups of measurements before transmitting the first radio signal.

In one embodiment, the first-type communication node stores the Q groups of first-type measurement values before transmitting the first radio signal.

In one embodiment, the first-type communication is required to store the Q groups of first-type measurement values before transmitting the first radio signal.

In one embodiment, the phrase that "the target subcarrier spacing is used for determining a group of first-type measurement values to which the X first-type measurement value(s) belongs(belong) out of the Q groups of first-type measurement values" refers to: the target subcarrier spacing is used for determining a group of first-type measurement values to which the X first-type measurement value(s) belongs(belong) out of the Q groups of first-type measurement values based on a correspondence relation.

In one embodiment, the phrase that "the target subcarrier spacing is used for determining a group of first-type measurement values to which the X first-type measurement value(s) belongs(belong) out of the Q groups of first-type measurement values" refers to: a sequential order of the target subcarrier spacing in the Q candidate subcarrier spacings is used for determining a group of first-type measurement values to which the X first-type measurement value(s) belongs(belong) out of the Q groups of first-type measurement values.

In one embodiment, the phrase that "the target subcarrier spacing is used for determining a group of first-type measurement values to which the X first-type measurement value(s) belongs(belong) out of the Q groups of first-type measurement values" refers to: an order of magnitude of the target subcarrier spacing in the Q candidate subcarrier spacings is used for determining a group of first-type measurement values to which the X first-type measurement value(s) belongs(belong) out of the Q groups of first-type measurement values.

In one embodiment, the phrase that "the target subcarrier spacing is used for determining a group of first-type measurement values to which the X first-type measurement value(s) belongs(belong) out of the Q groups of first-type measurement values" refers to: an index of the target subcarrier spacing in the Q candidate subcarrier spacings is used for determining a group of first-type measurement values to which the X first-type measurement value(s) belongs(belong) out of the Q groups of first-type measurement values.

In one embodiment, the phrase that "the target subcarrier spacing is used for determining a group of first-type measurement values to which the X first-type measurement value(s) belongs(belong) out of the Q groups of first-type measurement values" refers to: a group of first-type measurement values of the Q groups of first-type measurement values corresponding to the target subcarrier spacing is a groups of first-type measurement values that the X first-type measurement value(s) belongs (belong).

In one embodiment, the phrase that "the target subcarrier spacing is used for determining a group of first-type measurement values to which the X first-type measurement value(s) belongs(belong) out of the Q groups of first-type measurement values" refers to: one of the Q groups of first-type measurement values acquired by one of the Q groups of measurements targeting the target time-frequency unit set are performed is a group of first-type measurement values that the X first-type measurement value(s) belongs (belong).

Embodiment 15

Figure 15:
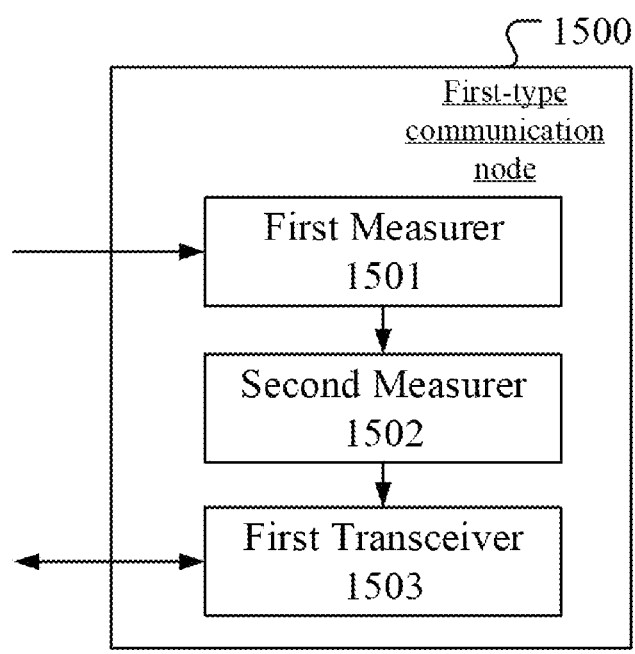
FIG. 15 illustrates a structure block diagram of a processing device in a first-type communication node according to one embodiment of the present disclosure.

Embodiment 15 illustrates a structure block diagram of a processing device in a first-type communication node according to one embodiment, as shown in FIG. 15. In FIG. 15, a first-type communication node processing device 1500 comprises a first measurer 1501, a second measurer 1502 and a first transceiver 1503. The first measurer 1501 comprises a receiver 456 (including an antenna 460), a receiving processor 452 and a controller/processor 490 in FIG. 4 of the present disclosure, or the first measurer 1501 comprises a receiver 516 (including an antenna 520), a receiving processor 512 and a controller/processor 540 in FIG. 5 of the present disclosure; the second measurer 1502 comprises a controller/processor 490 in FIG. 4 of the present disclosure, or a controller/processor 540 in FIG. 5 of the present disclosure; the first transceiver 1503 comprises a receiver/transmitter 456 (including an antenna 460), a receiving processor 452, a transmitting processor 455 and a controller/processor 490 in FIG. 4 of the present disclosure, or the first transceiver 1503 comprises a receiver/transmitter 516 (including an antenna 460), a receiving processor 512, a transmitting processor 515 and a controller/processor 540 in FIG. 5 of the present disclosure.

In Embodiment 15, the first measurer 1501 performs X measurement(s) respectively in X time-frequency unit(s), the X measurement(s) respectively being used for acquiring X first-type measurement value(s), the X being a positive integer; the second measurer 1502 performs a first measurement, the first measurement being used for acquiring a second-type measurement value; and the first transceiver 1503 transmits a first radio signal; herein, the X first-type measurement value(s) is(are) used for the first measurement, a second-type measurement value acquired by performing the first measurement is used for determining at least one of an MCS employed by the first radio signal or time-frequency resources occupied by the first radio signal; a number of time-frequency resources occupied by a time-frequency unit of the X time-frequency unit(s) is related to a subcarrier spacing of subcarriers occupied by the first radio signal.

In one embodiment, the first transceiver 1503 also receives first information; herein, each of X1 first-type measurement value(s) out of the X first-type measurement value(s) is greater than a target threshold, the second-type measurement value acquired by performing the first measurement is equal to a ratio of the X1 to the X, the X1 is a non-negative integer not greater than the X, the first information is used for determining the target threshold.

In one embodiment, a characteristic measurement value is a first-type measurement value of the X first-type measurement value(s), a measurement of the X measurement(s) used for acquiring the characteristic measurement value is performed in a characteristic time-frequency unit, the characteristic time-frequency unit is a time-frequency unit of the X time-frequency unit(s), the characteristic time-frequency unit comprises X2 multicarrier symbol(s) in time domain, the characteristic measurement value is an average value of receiving power value(s) of the X2 multicarrier symbol(s) within frequency domain resources occupied by the characteristic time-frequency unit.

In one embodiment, the first transceiver 1503 also transmits a first signaling; herein, the first signaling is used for indicating at least one of the MCS employed by the first radio signal, the time-frequency resources occupied by the first radio signal, or the subcarrier spacing of subcarriers occupied by the first radio signal, the first signaling is transmitted via an air interface; the X time-frequency unit(s) belongs(belong) to a first time window in time domain, the first measurement is performed in a second time window, an end time for the first time window is no later than a start time for the second time window, and an end time for the second time window is no later than a start time for transmission of the first radio signal.

In one embodiment, the first transceiver 1503 also receives second information; herein, the second-type measurement value acquired by performing the first measurement belongs to a target interval, the target interval is one of P candidate intervals, any candidate interval of the P candidate intervals is an interval of positive rational numbers, the P candidate intervals respectively correspond to P candidate MCS sets, the P candidate intervals respectively correspond to P candidate resource quantity sets, the P is a positive integer greater than 1; a candidate MCS set of the P candidate MCS sets that corresponds to the target interval is a first MCS set, and a candidate resource quantity set of the P candidate resource quantity sets that corresponds to the target interval is a first resource quantity set; the second information is used for determining at least one of the MCS employed by the first radio signal and the time-frequency resources occupied by the first radio signal, the MCS employed by the first radio signal is an MCS in the first MCS set, a number of the time-frequency resources occupied by the first radio signal is equal to a resource quantity in the first resource quantity set.

In one embodiment, the first transceiver 1503 also receives third information; herein, the third information is used for determining the subcarrier spacing of subcarriers occupied by the first radio signal.

In one embodiment, the second measurer 1502 also performs Y measurement(s) in a third time window, the Y measurement(s) is(are) used for respectively acquiring Y third-type measurement value(s), the Y is a positive integer; herein, the second-type measurement value acquired by performing the first measurement is used for determining a first upper bound, a sum of the Y third-type measurement value(s) is no greater than the first upper bound, a time domain position of the third time window is related to the time-frequency resources occupied by the first radio signal, the Y third-type measurement value(s) is(are) related to a number of time-frequency resources occupied by radio signal(s) transmitted by a transmitter of the first radio signal in the third time window.

In one embodiment, the first transceiver 1503 also determines a target time-frequency unit set out of Q candidate time-frequency unit sets; herein, a subcarrier spacing of subcarriers occupied by the first radio signal is a target subcarrier spacing, the target subcarrier spacing is a candidate subcarrier spacing of Q candidate subcarrier spacings, the Q is a positive integer greater than 1; the X time-frequency unit(s) belongs(belong) to the target time-frequency unit set, the Q candidate subcarrier spacings respectively correspond to the Q candidate time-frequency unit sets.

In one embodiment, the first transceiver 1503 also determines a target time-frequency unit set out of Q candidate time-frequency unit sets; herein, a subcarrier spacing of subcarriers occupied by the first radio signal is a target subcarrier spacing, the target subcarrier spacing is a candidate subcarrier spacing of Q candidate subcarrier spacings, the Q is a positive integer greater than 1; the X time-frequency unit(s) belongs(belong) to the target time-frequency unit set, the Q candidate subcarrier spacings respectively correspond to the Q candidate time-frequency unit sets; the X measurement(s) belongs(belong) to one of Q groups of measurements, the Q groups of measurements respectively correspond to the Q candidate time-frequency unit sets, the Q groups of measurements are used for acquiring Q groups of first-type measurement values, the X first-type measurement value(s) belongs(belong) to one of the Q groups of first-type measurement values, the target subcarrier spacing is used for determining a group of first-type measurement values to which the X first-type measurement value(s) belongs(belong) out of the Q groups of first-type measurement values.

Embodiment 16

Figure 16:
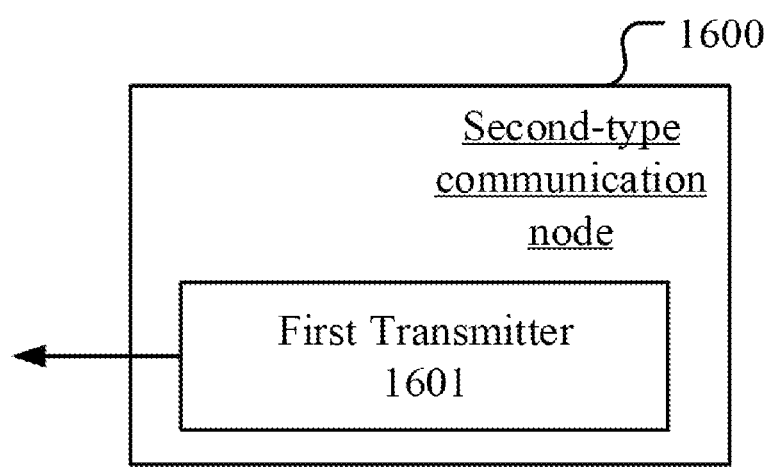
FIG. 16 illustrates a structure block diagram of a processing device in a second-type communication node according to one embodiment of the present disclosure.

Embodiment 16 illustrates a structure block diagram of a processing device in a second-type communication node according to one embodiment, as shown in FIG. 16. In FIG. 16, a second-type communication node processing device 1600 comprises a first transmitter 1601. The first transmitter 1601 comprises a transmitter/receiver 416 (including an antenna 420), a transmitting processor 415 and a controller/processor 440.

In Embodiment 16, the first transmitter 1601 transmits first information; herein, X measurement(s) respectively performed in X time-frequency unit(s) is(are) respectively used for acquiring X first-type measurement value(s), the X is a positive integer; the X first-type measurement value(s) is(are) used for a first measurement, the first measurement is used for acquiring a second-type measurement value, the second-type measurement value acquired by performing the first measurement is used for determining at least one of an MCS employed by the first radio signal or time-frequency resources occupied by the first radio signal; a number of time-frequency resources occupied by a time-frequency unit of the X time-frequency unit(s) is related to a subcarrier spacing of subcarriers occupied by the first radio signal; each of X1 first-type measurement value(s) out of the X first-type measurement value(s) is greater than a target threshold, the second-type measurement value acquired by performing the first measurement is equal to a ratio of the X1 to the X, the X1 is a non-negative integer not greater than the X, the first information is used for determining the target threshold.

In one embodiment, a characteristic measurement value is a first-type measurement value of the X first-type measurement value(s), a measurement of the X measurement(s) used for acquiring the characteristic measurement value is performed in a characteristic time-frequency unit, the characteristic time-frequency unit is a time-frequency unit of the X time-frequency unit(s), the characteristic time-frequency unit comprises X2 multicarrier symbol(s) in time domain, the characteristic measurement value is an average value of receiving power value(s) of the X2 multicarrier symbol(s) within frequency domain resources occupied by the characteristic time-frequency unit.

In one embodiment, the X time-frequency unit(s) belongs (belong) to a first time window in time domain, the first measurement is performed in a second time window, an end time for the first time window is no later than a start time for the second time window, and an end time for the second time window is no later than a start time for transmission of the first radio signal.

In one embodiment, the first transmitter 1601 also transmits second information; herein, the second-type measurement value acquired by performing the first measurement belongs to a target interval, the target interval is one of P candidate intervals, any candidate interval of the P candidate intervals is an interval of positive rational numbers, the P candidate intervals respectively correspond to P candidate MCS sets, the P candidate intervals respectively correspond to P candidate resource quantity sets, the P is a positive integer greater than 1; a candidate MCS set of the P alternative MCS sets that corresponds to the target interval is a first MCS set, and a candidate resource quantity set of the P candidate resource quantity sets that corresponds to the target interval is a first resource quantity set; the second information is used for determining at least one of the MCS employed by the first radio signal and the time-frequency resources occupied by the first radio signal, the MCS employed by the first radio signal is an MCS in the first MCS set, a number of the time-frequency resources occupied by the first radio signal is equal to a resource quantity in the first resource quantity set.

In one embodiment, the first transmitter 1601 also transmits third information; herein, the third information is used for determining the subcarrier spacing of subcarriers occupied by the first radio signal.

The ordinary skill in the art may understand that all or part of steps in the above method may be implemented by instructing related hardware through a program. The program may be stored in a computer readable storage medium, for example, Read-Only-Memory (ROM), hard disk or compact disc, etc. Optionally, all or part of steps in the above embodiments also may be implemented by one or more integrated circuits. Correspondingly, each module unit in the above embodiment may be realized in the form of hardware, or in the form of software function modules. The present disclosure is not limited to any combination of hardware and software in specific forms. The first-type communication node or UE or terminal in the present disclosure includes but is not limited to mobile phones, tablet computers, notebooks, network cards, low-consumption equipment, enhanced MTC (eMTC) equipment, NB-IOT terminals, vehicle-mounted equipment, aircrafts, airplanes, unmanned aerial vehicles, telecontrolled aircrafts, etc. The second-type communication node or base station or network side equipment in the present disclosure includes but is not limited to macro-cellular base stations, micro-cellular base stations, home base stations, relay base station, eNB, gNB, Transmitter Receiver Point (TRP), relay satellites, satellite base station, aerial base station and other radio communication equipment.

The above are merely the preferred embodiments of the present disclosure and are not intended to limit the scope of protection of the present disclosure. Any modification, equivalent substitute and improvement made within the spirit and principle of the present disclosure are intended to be included within the scope of protection of the present disclosure.

What is claimed is:

1. A method in a first-type communication node used for wireless communication, comprising:
performing X measurements respectively in X time-frequency units, the X measurements respectively being used for acquiring X first-type measurement values, the X being a positive integer;
performing a first measurement, the first measurement being used for acquiring a second-type measurement value; and
transmitting a first radio signal;
wherein the X first-type measurement values are used for the first measurement, a second-type measurement value acquired by performing the first measurement is used for determining at least one of a Modulation Coding Scheme (MCS) employed by the first radio signal or time-frequency resources occupied by the first radio signal; a number of time-frequency resources occupied by a time-frequency unit of the X time-frequency units is related to a subcarrier spacing of subcarriers occupied by the first radio signal; wherein:
a characteristic measurement value is a first-type measurement value of the X first-type measurement values;
a measurement of the X measurements used for acquiring the characteristic measurement value is performed in a characteristic time-frequency unit;
the characteristic time-frequency unit is a time-frequency unit of the X time-frequency units;
the characteristic time-frequency unit comprises X2 multicarrier symbols in time domain; and the characteristic measurement value is an average value of receiving power values of the X2 multicarrier symbols within frequency domain resources occupied by the characteristic time-frequency unit;

any of the X time-frequency units occupies a sub-channel in frequency domain and occupies a positive integer number of consecutive multicarrier symbols in time domain; any two of the X time-frequency units comprise equal numbers of time-frequency resources, the X is greater than 1;

each of the X time-frequency units comprises X2 multicarrier symbols which can be used for one of the X measurements in time domain;

the characteristic time-frequency unit comprises a multicarrier other than the X2 multicarrier symbols in time domain.

2. The method according to claim 1, further comprising: receiving first information;

wherein each of X1 first-type measurement value(s) out of the X first-type measurement values is greater than a target threshold, the second-type measurement value acquired after performing the first measurement is equal to a ratio of the X1 to the X, the X1 is a non-negative integer not greater than the X; the target threshold is equal to a threshold value in a first threshold set, the first threshold set comprises a positive integer number of threshold values, wherein threshold values in the first threshold set are pre-defined, the first information is used for determining the target threshold out of the first threshold set; the first information comprises all or part of an RRC signaling and the first information is UE-specific.

3. The method according to claim 1, further comprising: transmitting a first signaling;

wherein the first signaling is used for indicating an MCS employed by the first radio signal and frequency resources occupied by the first radio signal, the first signaling is transmitted via an air interface; the X time-frequency units belong to a first time window in time domain, the first measurement is performed in a second time window, an end time for the first time window is no later than a start time for the second time window, and an end time for the second time window is no later than a start time for transmission of the first radio signal; the time length of the first time window is 100 ms or the time length of the first time window is related to a subcarrier spacing of subcarriers occupied by the first radio signal, the time length of the first time window can be configured.

4. The method according to claim 1, further comprising: receiving second information;

wherein the second-type measurement value acquired by performing the first measurement belongs to a target interval, the target interval is one of P candidate intervals, any candidate interval of the P candidate intervals is an interval of positive rational numbers, the P candidate intervals respectively correspond to P candidate MCS sets, the P candidate intervals respectively correspond to P candidate resource quantity sets, the P is a positive integer greater than 1; a candidate MCS set of the P candidate MCS sets that corresponds to the target interval is a first MCS set, and a candidate resource quantity set of the P candidate resource quantity sets that corresponds to the target interval is a first resource quantity set; the second information is used for determining at least one of an MCS employed by the first radio signal or time-frequency resources occupied by the first radio signal, an MCS employed by the first radio signal is an MCS in the first MCS set, a number of time-frequency resources occupied by the first radio signal is equal to a resource quantity in the first resource quantity set.

5. The method according to claim 4, wherein the second information comprises all or part of fields of a DCI signaling, the second information comprises all or part of an RRC signaling, or the second information is transmitted from a higher layer of the first-type communication node to a physical layer of the first-type communication node; any of the P candidate MCS sets comprises a positive integer number of MCSs, the P candidate MCS sets can be configured or pre-configured, the one-to-one correspondence relation between the P candidate intervals and the P candidate MCS sets is configured or pre-configured; the P candidate resource quantity sets are configured or pre-configured, the one-to-one correspondence relation between the P candidate intervals and the P candidate resource quantity sets is configured or pre-configured.

6. The method according to claim 1, further comprising: receiving third information;

wherein the third information is used for determining a subcarrier spacing of subcarriers occupied by the first radio signal; the second information comprises all or part of an RRC signaling, the second information is UE-specific.

7. The method according to claim 1, further comprising: performing Y measurement(s) in a third time window, the Y measurement(s) is(are) used for respectively acquiring Y third-type measurement value(s), the Y is a positive integer;

wherein the second-type measurement value acquired by performing the first measurement is used for determining a first upper bound, a sum of the Y third-type measurement value(s) is no greater than the first upper bound, a time domain position of the third time window is related to the time-frequency resources occupied by the first radio signal, the Y third-type measurement value(s) is(are) related to a number of time-frequency resources occupied by radio signal(s) transmitted by a transmitter of the first radio signal in the third time window.

8. The method according to claim 7, wherein any of the Y measurement(s) is a measurement on Channel occupancy Ratio (CR), the Y third-type measurement value(s) respectively correspond to Y priority index(es), a priority index of a priority of a packet carried by the first radio signal is equal to a minimum index value of the Y priority index(es); the second-type measurement value acquired by performing the first measurement determines the first upper bound based on a correspondence relation, wherein the correspondence relation is configurable.

9. The method according to claim 7, wherein the time length of the third time window is configured or pre-configured; the third time window is divided into a first time sub-window and a second time sub-window by time, the time length of the first time sub-window, which is not less than a length threshold, is determined by the first-type communication node itself, an end time for the second time sub-window is no later than a latest end time for reserved time domain resources configured in the grant of the first radio signal.

10. The method according to claim 1, wherein any of the X time-frequency units occupies a slot in time domain, a time domain position of the X2 multicarrier symbols in the characteristic time-frequency unit is configurable, a time domain position of the X2 multicarrier symbols in the characteristic time-frequency unit is related to a subcarrier spacing of subcarriers occupied by the first radio signal.

11. A first-type communication node used for wireless communication, comprising:
a first measurer, performing X measurements respectively in X time-frequency units, the X measurements respectively being used for acquiring X first-type measurement values, the X being a positive integer;
a second measurer, performing a first measurement, the first measurement being used for acquiring a second-type measurement value; and
a first transceiver, transmitting a first radio signal;
wherein the X first-type measurement values are used for the first measurement, a second-type measurement value acquired by performing the first measurement is used for determining at least one of an MCS employed by the first radio signal or time-frequency resources occupied by the first radio signal; a number of time-frequency resources occupied by a time-frequency unit of the X time-frequency units is related to a subcarrier spacing of subcarriers occupied by the first radio signal; wherein:
a characteristic measurement value is a first-type measurement value of the X first-type measurement values;
a measurement of the X measurements used for acquiring the characteristic measurement value is performed in a characteristic time-frequency unit;
the characteristic time-frequency unit is a time-frequency unit of the X time-frequency units;
the characteristic time-frequency unit comprises X2 multicarrier symbols in time domain; and
the characteristic measurement value is an average value of receiving power values of the X2 multicarrier symbols within frequency domain resources occupied by the characteristic time-frequency unit;
any of the X time-frequency units occupies a sub-channel in frequency domain and occupies a positive integer number of consecutive multicarrier symbols in time domain; any two of the X time-frequency units comprise equal numbers of time-frequency resources, the X is greater than 1;
each of the X time-frequency units comprises X2 multicarrier symbols which can be used for one of the X measurements in time domain;
the characteristic time-frequency unit comprises a multicarrier other than the X2 multicarrier symbols in time domain.

12. The first-type communication node according to claim 11, wherein the first transceiver receives first information; wherein each of X1 first-type measurement value(s) out of the X first-type measurement values is greater than a target threshold, the second-type measurement value acquired by performing the first measurement is equal to a ratio of the X1 to the X, the X1 is a non-negative integer not greater than the X; the target threshold is equal to a threshold value in a first threshold set, the first threshold set comprises a positive integer number of threshold values, wherein threshold values in the first threshold set are pre-defined, the first information is used for determining the target threshold out of the first threshold set; the first information comprises all or part of an RRC signaling and the first information is UE-specific.

13. The first-type communication node according to claim 11, wherein the first transceiver transmits a first signaling; wherein the first signaling is used for indicating an MCS employed by the first radio signal and frequency resources occupied by the first radio signal, the first signaling is transmitted via an air interface; the X time-frequency units belong to a first time window in time domain, the first measurement is performed in a second time window, an end time for the first time window is no later than a start time for the second time window, and an end time for the second time window is no later than a start time for transmission of the first radio signal; the time length of the first time window is 100 ms or the time length of the first time window is related to a subcarrier spacing of subcarriers occupied by the first radio signal, the time length of the first time window can be configured.

14. The first-type communication node according to claim 11, wherein the first transceiver receives second information; herein, the second-type measurement value acquired by performing the first measurement belongs to a target interval, the target interval is one of P candidate intervals, any candidate interval of the P candidate intervals is an interval of positive rational numbers, the P candidate intervals respectively correspond to P candidate MCS sets, the P candidate intervals respectively correspond to P candidate resource quantity sets, the P is a positive integer greater than 1; a candidate MCS set of the P candidate MCS sets that corresponds to the target interval is a first MCS set, and a candidate resource quantity set of the P candidate resource quantity sets that corresponds to the target interval is a first resource quantity set; the second information is used for determining at least one of an MCS employed by the first radio signal or time-frequency resources occupied by the first radio signal, an MCS employed by the first radio signal is an MCS in the first MCS set, a number of time-frequency resources occupied by the first radio signal is equal to a resource quantity in the first resource quantity set.

15. The first-type communication node according to claim 14, wherein the second information comprises all or part of fields of a DCI signaling, the second information comprises all or part of an RRC signaling, or the second information is transmitted from a higher layer of the first-type communication node to a physical layer of the first-type communication node; any of the P candidate MCS sets comprises a positive integer number of MCSs, the P candidate MCS sets can be configured or pre-configured, the one-to-one correspondence relation between the P candidate intervals and the P candidate MCS sets is configured or pre-configured; the P candidate resource quantity sets are configured or pre-configured, the one-to-one correspondence relation between the P candidate intervals and the P candidate resource quantity sets is configured or pre-configured.

16. The first-type communication node according to claim 11, wherein the first transceiver receives third information; wherein the third information is used for determining a subcarrier spacing of subcarriers occupied by the first radio signal; the second information comprises all or part of an RRC signaling, the second information is UE-specific.

17. The first-type communication node according to claim 11, wherein the second measurer performs Y measurement(s) in a third time window, the Y measurement(s) is(are) used for respectively acquiring Y third-type measurement value(s), the Y is a positive integer; the second-type measurement value acquired by performing the first measurement is used for determining a first upper bound, a sum of the Y third-type measurement value(s) is no greater than the first upper bound, a time domain position of the third time window is related to time-frequency resources occupied by the first radio signal, the Y third-type measurement value(s) is(are) related to a number of time-frequency resources occupied by radio signal(s) transmitted by a transmitter of the first radio signal in the third time window.

18. The first-type communication node according to claim 17, wherein any of the Y measurement(s) is a measurement on Channel occupancy Ratio (CR), the Y third-type measurement value(s) respectively correspond to Y priority index(es), a priority index of a priority of a packet carried by the first radio signal is equal to a minimum index value of the Y priority index(es); the second-type measurement value acquired by performing the first measurement determines the first upper bound based on a correspondence relation, wherein the correspondence relation is configurable.

19. The first-type communication node according to claim 17, wherein the time length of the third time window is configured or pre-configured; the third time window is divided into a first time sub-window and a second time sub-window by time, the time length of the first time sub-window, which is not less than a length threshold, is determined by the first-type communication node itself, an end time for the second time sub-window is no later than a latest end time for reserved time domain resources configured in the grant of the first radio signal.

20. The first-type communication node according to claim 11, wherein any of the X time-frequency units occupies a slot in time domain, a time domain position of the X2 multicarrier symbols in the characteristic time-frequency unit is configurable, a time domain position of the X2 multicarrier symbols in the characteristic time-frequency unit is related to a subcarrier spacing of subcarriers occupied by the first radio signal.

\* \* \* \* \*

UNITED STATES PATENT AND TRADEMARK OFFICE
CERTIFICATE OF CORRECTION

Page 1 of 1

PATENT NO. : 11,696,166 B2
APPLICATION NO. : 17/837064
DATED : July 4, 2023
INVENTOR(S) : Zheng Liu, Xiaobo Zhang and Lin Yang It is certified that error appears in the above-identified patent and that said Letters Patent is hereby corrected as shown below:

On the Title Page

Page 2, (56) References Cited, Foreign Patent Documents: "CN 2018084599 A1 5/2018" should read "WO 2018084599 A1 5/2018".

Signed and Sealed this
Fourteenth Day of May, 2024

Katherine Kelly Vidal
*Director of the United States Patent and Trademark Office*